US012580715B2

(12) United States Patent
Wang et al.

(10) Patent No.: US 12,580,715 B2
(45) Date of Patent: Mar. 17, 2026

(54) ENHANCED SCHEDULING FOR BEAM BASED TRANSMISSION

(71) Applicant: Telefonaktiebolaget LM Ericsson (PUBL), Stockholm (SE)

(72) Inventors: Min Wang, Luleå (SE); Mårten Ericson, Gammelstad (SE); Jan Christoffersson, Luleå (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 615 days.

(21) Appl. No.: 17/998,413

(22) PCT Filed: May 14, 2021

(86) PCT No.: PCT/IB2021/054154
§ 371 (c)(1),
(2) Date: Nov. 10, 2022

(87) PCT Pub. No.: WO2021/229527
PCT Pub. Date: Nov. 18, 2021

(65) Prior Publication Data
US 2023/0179385 A1 Jun. 8, 2023

Related U.S. Application Data

(60) Provisional application No. 63/024,844, filed on May 14, 2020.

(51) Int. Cl.
*H04W 4/00* (2018.01)
*H04B 7/06* (2006.01)
(Continued)

(52) U.S. Cl.
CPC ....... *H04L 5/0094* (2013.01); *H04B 7/06952* (2023.05); *H04L 5/0023* (2013.01);
(Continued)

(58) Field of Classification Search
CPC ............ H04W 72/1268; H04W 72/046; H04L 5/0094; H04L 5/0023; H04L 5/0044
See application file for complete search history.

(56) References Cited

U.S. PATENT DOCUMENTS 10,411,784 B2    9/2019   Kwon et al.
2019/0132109 A1 *  5/2019   Zhou ................... H04L 27/2607
(Continued)

FOREIGN PATENT DOCUMENTS

WO    WO-2019032882 A1 *   2/2019   ............. H04B 7/088
WO    WO-2020141987 A1 *   7/2020   ........... H04B 7/0695

OTHER PUBLICATIONS

3GPP TSG RAN WG1 Meeting #91; Reno, USA; Source: Huawei, HiSilicon; Title: Design of PRACH-based beam failure recovery (R1-1719808)—Nov. 27-Dec. 1, 2017.
(Continued)

*Primary Examiner* — Elisabeth Benoit Magloire
(74) *Attorney, Agent, or Firm* — Baker Botts L.L.P.

(57) ABSTRACT

According to some embodiments, a method performed by a wireless device comprises obtaining an indication of an initial resource region. The initial resource region comprising time frequency resources, wherein the time frequency resources are divided into a plurality of scheduling occasions (SOs) and each of the plurality of SOs is associated with an uplink beam. The method further comprises: determining the wireless device has moved out of coverage of a first beam and that uplink resources associated with the first beam should no longer be used; selecting a second beam for uplink transmission; selecting a SO associated with the second beam from the initial resource region; and transmitting an initial transmission of uplink data in the selected SO using the second beam.

24 Claims, 17 Drawing Sheets

1000

1012 – obtain an indication of an initial resource region

1014 – determine the wireless device has moved out of coverage of a first beam and that uplink resources associated with the first beam should no longer be used 1016 – select a second beam for uplink transmission 1018 – select a SO associated with the second beam from the initial resource region 1020 – transmit an initial transmission of uplink data in the selected SO using the second beam 1022 – receive a scheduling grant from the network node, the scheduling grant comprising an indication of time frequency resources not included in the initial resource region 1024 – transmit uplink data in the time frequency resources indicated in the scheduling grant

(51) Int. Cl.

| | | |
|---|---|---|
| *H04L 5/00* | (2006.01) | |
| *H04W 72/044* | (2023.01) | |
| *H04W 72/1268* | (2023.01) | |
| *H04W 72/232* | (2023.01) | |

(52) U.S. Cl.

CPC ......... *H04L 5/0044* (2013.01); *H04W 72/046* (2013.01); *H04W 72/1268* (2013.01); *H04W 72/232* (2023.01)

(56) References Cited

U.S. PATENT DOCUMENTS

| | | | | |
|---|---|---|---|---|
| 2019/0215048 | A1* | 7/2019 | Cirik | ................. H04W 56/0045 |
| 2019/0342872 | A1* | 11/2019 | Rune | .................... H04L 5/0048 |
| 2020/0107341 | A1* | 4/2020 | Zhang | ................. H04W 56/001 |
| 2020/0314913 | A1* | 10/2020 | Rastegardoost | ...... H04W 74/04 |

| | | | | |
|---|---|---|---|---|
| 2020/0350972 | A1* | 11/2020 | Yi | ........................... H04B 7/088 |
| 2020/0374960 | A1* | 11/2020 | Deenoo | ................. H04B 7/088 |
| 2021/0282137 | A1* | 9/2021 | Wang | .................... H04W 72/23 |
| 2021/0352697 | A1* | 11/2021 | Irukulapati | .......... H04B 7/0695 |
| 2022/0225258 | A1* | 7/2022 | Ratasuk | ................ H04W 72/20 |
| 2023/0141838 | A1* | 5/2023 | Long | ................... H04B 7/0695 |
| | | | | 375/267 |
| 2023/0189343 | A1* | 6/2023 | Rao | ........................ H04B 7/088 |
| | | | | 370/329 |

OTHER PUBLICATIONS

PCT International Search Report issued for International application No. PCT/IB2021/054154—Jul. 1, 2021.

PCT Written Opinion of the International Searching Authority issued for International application No. PCT/IB2021/054154—Jul. 1, 2021.

* cited by examiner

Prior Art

1. UE1 and UE2 are initially located in SSB1 coverage, UE1 and UE2 have configured grants in the same time occasions 2. After a while, UE 1 moves to SSB2, while UE2 is still at SSB1.

3. If both UE1 and UE2 transmit data at the same time on different beams (UE1 is on SSB2, while UE2 on SSB1), due to analog beamforming capability, gNB only listens to SSB1, therefore, data from UE1 may be lost

Fig. 7

Step 1: UE1 moves away from SSB1 to SSB2

Step 2: CSI measurement indicates that UE1 arrives in SSB2 coverage area

Step 3: UE1 determins the next availabe SO (e.g., random selection from all SOs) according to the selected SSB or CSI-RS Step 4: UE1 transmits an initail transmission using the selected SO.

In the initial transmission, UCI is multiplexed with PUSCH. The UCI carries UE ID, HARQ process, RV, preferred MCS.

In the payload, if buffer level is over a configured threshold, a BSR is included regardless if there is a corresponding BSR event triggered Step 5: upon reception of the initial transmission, the gNB performs scheduling to the UE with furhter resources, i.e., dynamic grants or configured grants

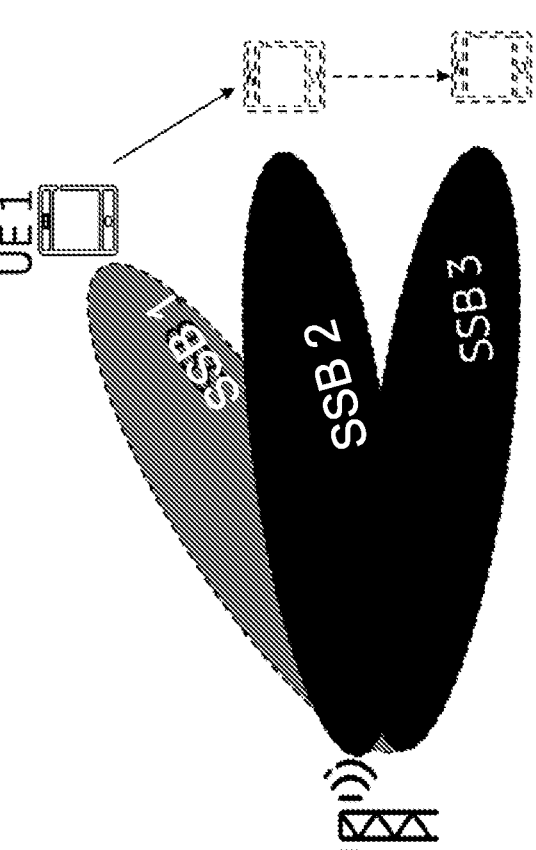

UE 1

SSB 1

SSB 2

SSB 3

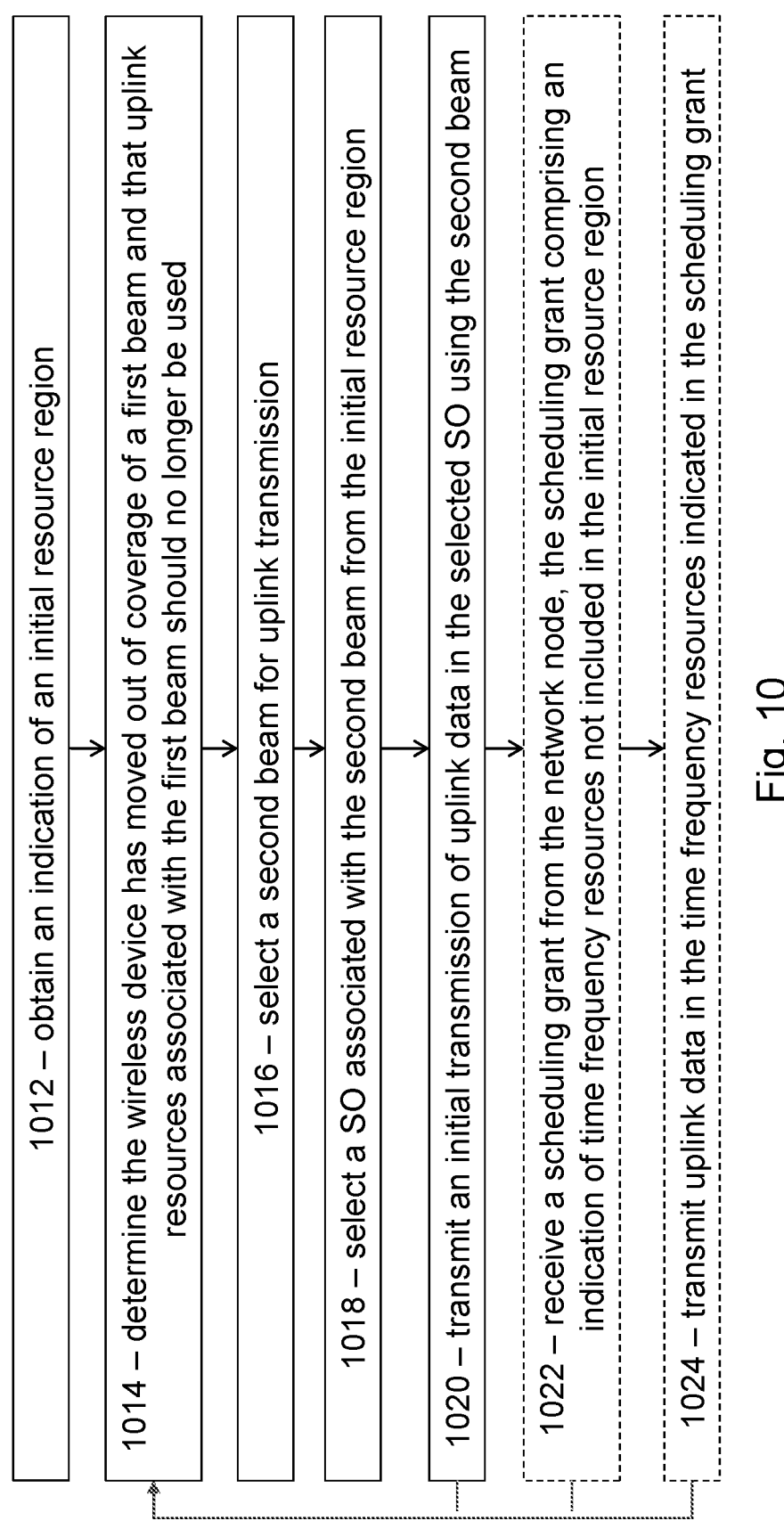

1000

1012 – obtain an indication of an initial resource region

1014 – determine the wireless device has moved out of coverage of a first beam and that uplink resources associated with the first beam should no longer be used 1016 – select a second beam for uplink transmission 1018 – select a SO associated with the second beam from the initial resource region 1020 – transmit an initial transmission of uplink data in the selected SO using the second beam 1022 – receive a scheduling grant from the network node, the scheduling grant comprising an indication of time frequency resources not included in the initial resource region 1024 – transmit uplink data in the time frequency resources indicated in the scheduling grant

Fig. 10

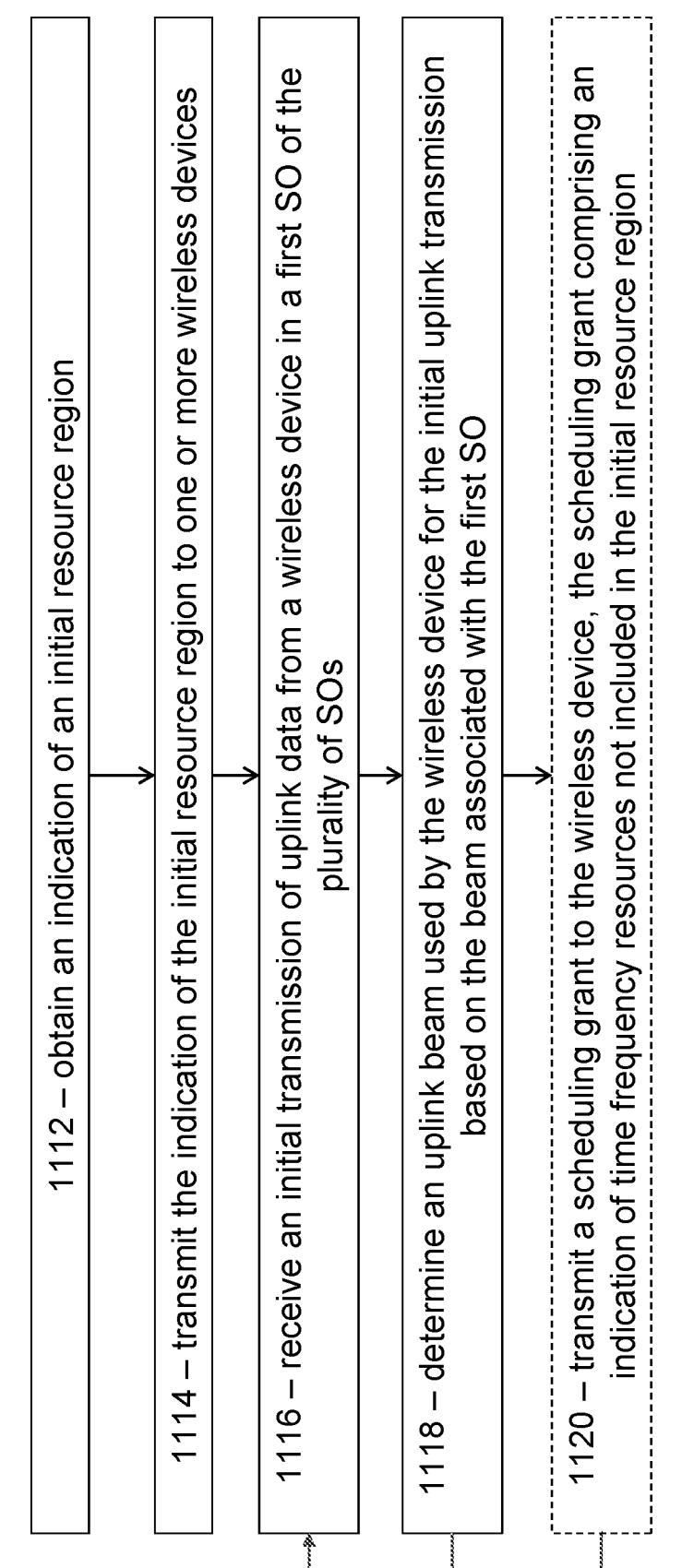

1100

1112 – obtain an indication of an initial resource region

1114 – transmit the indication of the initial resource region to one or more wireless devices 1116 – receive an initial transmission of uplink data from a wireless device in a first SO of the plurality of SOs 1118 – determine an uplink beam used by the wireless device for the initial uplink transmission based on the beam associated with the first SO 1120 – transmit a scheduling grant to the wireless device, the scheduling grant comprising an indication of time frequency resources not included in the initial resource region

Fig. 11

1700
Network Node

1702
Receiving Module

1704
Determining Module

1706
Transmitting Module

1600
Wireless Device

1602
Receiving Module

1604
Determining Module

1606
Transmitting Module

ENHANCED SCHEDULING FOR BEAM BASED TRANSMISSION

PRIORITY

This nonprovisional application is a U.S. National Stage Filing under 35 U.S.C. § 371 of International Patent Application Serial No. PCT/IB2021/054154 filed May 14, 2021 and entitled "ENHANCED SCHEDULING FOR BEAM BASED TRANSMISSION" which claims priority to U.S. Provisional Patent Application No. 63/024,844 filed May 14, 2020 both of which are hereby incorporated by reference in their entirety.

TECHNICAL FIELD

Embodiments of the present disclosure are directed to wireless communications and, more particularly, enhanced scheduling for beam based transmission.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Mobile broadband will continue to drive the demands for higher overall traffic capacity and higher achievable end-user data rates in the wireless access network. Several scenarios in the future will require data rates of up to 10 Gbps in local areas. These demands for very high system capacity and very high end-user date rates can be met by networks with distances between access nodes ranging from a few meters in indoor deployments up to roughly 50 m in outdoor deployments, i.e., with an infrastructure density considerably higher than the densest networks of today. The wide transmission bandwidths needed to provide data rates up to 10 Gbps and above can likely only be obtained from spectrum allocations in the millimeter-wave band. High-gain beamforming, typically realized with array antennas, can be used to mitigate the increased pathloss at higher frequencies. Such networks are referred to as new radio (NR) systems in the following.

NR supports a diverse set of use cases and a diverse set of deployment scenarios. The later includes deployment at both low frequencies (100s of MHz), and very high frequencies (mm waves in the tens of GHz). Two operation frequency, ranges are defined in NR Rel-15: frequency range one (FR1) from 410 MHz to 7125 MHz and frequency range two (FR2) from 24.250 GHz to 52.6 GHz.

NR may also support operation from 52.60 Hz to 71 GHz, which may require changes to NR using existing downlink/uplink NR waveform. For example, changes may include modifications of applicable numerology including subcarrier spacing, channel bandwidth (BW) (including maximum BW), and their impact to FR2 physical layer design to support system functionality considering practical radio frequency (RF) impairments. Modification may include changes to physical signal/channels and channel access mechanism, considering potential interference to/from other nodes, assuming beam-based operation, to comply with the regulatory requirements applicable to unlicensed spectrum for frequencies between 52.6 GHz and 71 GHz. Potential interference impact, if identified, may require interference mitigation solutions as part of channel access mechanism.

Similar to long term evolution (LTE), NR uses OFDM (Orthogonal Frequency Division Multiplexing) in the downlink (i.e., from a network node, gNB, eNB, or base station, to a user equipment or UE). The basic NR physical resource over an antenna port can thus be seen as a time-frequency grid as illustrated in FIG. 1.

FIG. 1 illustrates the NR physical resource grid. The horizontal axis represents time and the vertical axis represents frequency. A resource block (RB) in a 14-symbol slot is shown. A resource block corresponds to 12 contiguous subcarriers in the frequency domain. Resource blocks are numbered in the frequency domain, starting with 0 from one end of the system bandwidth. Each resource element corresponds to one OFDM subcarrier during one OFDM symbol interval.

Different subcarrier spacing values are supported in NR. The supported subcarrier spacing values (also referred to as different numerologies) are given by $\Delta f=(15\times2^\mu)$ kHz where $\mu\in(0,1,2,3,4)$. $\Delta f=15$ kHz is the basic (or reference) subcarrier spacing that is also used in LTE.

In the time domain, downlink and uplink transmissions in NR are organized into equally-sired subframes of 1 ms each, similar to LTE. A subframe is further divided into multiple slots of equal duration. The slot length for subcarrier spacing $\Delta f=(15\times2^\mu)$ kHz is $\frac{1}{2}^\mu$ms. There is only one slot per subframe for $\Delta f=15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. The control information is typically transmitted in the first one or two OFDM symbols in each slot in NR. The control information is carried on the physical downlink control channel (PDCCH) and data is carried on the physical downlink shared channel (PDSCH). A UE first detects and decodes PDCCH and if a PDCCH is decoded successfully, it then decodes the corresponding PDSCH based on the downlink assignment provided by decoded control information in the PDCCH In addition to PDCCH and PDSCH, there are also other channels and reference signals transmitted in the downlink, including synchronization signal block (SSB), channel state information reference signal (CSI-RS), etc.

Uplink data transmissions, carried on physical uplink shared channel (PUSCH), can also be dynamically scheduled by the gNB by transmitting DCI. The DCI (which is transmitted in the downlink region) indicates a scheduling time offset so that the PUSCH is transmitted in a slot in the uplink region.

As the operating frequency of wireless networks increases and moves to millimeter-wave territory, data transmission between nodes suffers from high propagation loss, which is proportional to the square of the carrier frequency. Moreover, a millimeter-wave signal also suffers from high oxygen absorption, high penetration loss and a variety of blockage problems.

On the other hand, with the wavelength as small as less than a centimeter, it becomes possible to pack a large amount (tens, hundreds or even thousands) of antenna elements into a single antenna array with a compact form factor, which can be widely adopted in a network equipment and a user device. Such antenna arrays/panels can generate narrow beams with high beam forming gain to compensate for the high path loss in mm-wave communications, as well as providing highly directional transmission and reception pattern.

As a consequence, directional transmission and reception are the distinguishing characteristics for wireless networks in mm-wave bands. In addition, a transmitter/receiver can typically only transmit/receive in one or perhaps a few directions at any given time.

NR supports two types of configured grant (CG) uplink transmission schemes, referred as CG Type1 and CG Type2 in the standard. The major difference between the two types of CG transmission is that for CG Type1, an uplink grant is provided by radio resource control (RRC) configuration and activated automatically, while in the case of CG Type2, the uplink grant is provided and activated via L1 signaling, i.e., by an uplink DCI with cyclic redundancy check (CRC) scrambled by cell specific radio network temporary identifier (CS-RNTI).

In both cases, the spatial relation used for PUSCH transmission with configured grant is indicated by the uplink grant, either provided by the RRC configuration or by an uplink DCI. The uplink grant contains an srs-ResourceIndicator field, pointing to one of the sounding reference signal (SRS) resources in the SRS resource configuration, which can be configured in-turn with a spatial relation to a downlink reference signal (SSB or CSI-RS) or another SRS resource.

With the SRS resource indicator in the uplink grant and the RRC SRS resource configuration, PUSCH with configured grant is supposed to be transmitted with the same premier or beamforming weights as the one used for the transmission of the reference SRS.

In NR, configured scheduling is used to allocate semi-static periodic assignments or grants for a UE. For uplink, there are two types of configured scheduling schemes: Type 1 and Type 2. For Type 1, configured grants are configured via RRC signaling only. For Type 2, similar configuration procedure as semi-persistent scheduling (SPS) uplink in LTE was defined, i.e., some parameters are preconfigured via RRC signaling and some physical layer parameters are configured via medium access control (MAC) scheduling procedure. The detailed procedures can be found in 3GPP TS 38.321 clause 5.8.2.

Like for SPS in LTE, the CG periodicity is RRC configured, and this is specified in the ConfiguredGrantConfig IE. Different periodicity values are supported in NR depending on the subcarrier spacing (SCS). For example, for 15 and 30 kHz SCS, the following periodicities are supported, expressed in a number of OFDM symbols. 15 kHz SCS supports 2, 7, and $n*14$ OFDM symbols where $n \in \{1, 2, 4, 5, 8, 10, 16, 20, 32, 40, 64, 80, 128, 160, 320, 640\}$. 30 kHz SCS supports 2, 7, and $n*14$ OFDM symbols where $n \in \{1, 2, 4, 5, 8, 10, 16, 20, 32, 40, 64, 80, 128, 160, 256, 320, 640, 1280\}$.

For Type1 configured grants, in addition to the periodicity, the time domain allocation of PUSCH is configured purely via RRC signalling. The parameter timeDomainOffset provides a slot offset with respect to system frame number (SFN) 0. The parameter timeDomainAllocation provides an index into a table of 16 possible combinations of PUSCH mapping type (TypeA or TypeB), start symbol S for the mapping (S=OFDM symbol 0, 2, 4, or 8 within a slot), and length L of the mapping (L=4, 6, 8, 10, 12, or 14 OFDM symbols).

For Type2 configured grants, the periodicity is configured by RRC in the same way as for Type1, but the slot offset is dynamically indicated and is given by the slot in which the UE receives the DCI that activates the Type2 configured grant. In contrast to Type1, the time domain allocation of PUSCH is indicated dynamically by DCI via the time domain resource assignment field in the same way as for scheduled (non-CG) PUSCH. The DCI field indexes a table of start symbol and length (SLIV) values. The detailed configuration details of the RRC spec (i.e., 3GPP TS 38.331) for configured grant is illustrated as below.

TABLE 1

| Rel-16 ConfiguredGrantConfig IE in the RRC specification. | |
| --- | --- |
| -- ASN1START | |
| -- TAG-CONFIGUREDGRANTCONFIG-START | |
| ConfiguredGrantConfig ::= | SEQUENCE { |
| frequency Hopping | ENUMERATED {intraSlot, |
| interSlot} | OPTIONAL, -- Need S |
| cg-DMRS-Configuration | DMRS-UplinkConfig, |
| mcs-Table | ENUMERATED {qam256, |
| qam64LowSE} | OPTIONAL, -- Need S |
| mcs-TableTransformPrecoder | ENUMERATED {qam256, |
| qam64LowSE} | OPTIONAL, -- Need S |
| uci-OnPUSCH | SetupRelease { CG-UCI- |
| OnPUSCH } | OPTIONAL, -- Need M |
| resourceAllocation | ENUMERATED |
| { resourceAllocationType0, resourceAllocationType1, dynamicSwitch }, | |
| rbg-Size | ENUMERATED {config2} |
| OPTIONAL, -- Need S | |
| powerControlLoopToUse | ENUMERATED {n0, n1}, |
| p0-PUSCH-Alpha | p0-PUSCH-AlphaSetId, |
| transformPrecoder | ENUMERATED {enabled, |
| disabled} | OPTIONAL, -- Need S |
| nrofHARQ-Processes | INTEGER(1..16), |
| repK | ENUMERATED {n1, n2, n4, n8}, |
| repK-RV | ENUMERATED {s1-0231, s2- |
| 0303, s3-0000} | OPTIONAL, -- Need R |

TABLE 1-continued

Rel-16 ConfiguredGrantConfig IE in the RRC specification.

| | |
|---|---|
| periodicity | ENUMERATED {<br>sym2, sym7, sym1x14,<br>sym2x14, sym4x14, sym5x14, sym8x14, sym10x14, sym16x14,<br>sym20x14, sym32x14, sym40x14, sym64x14, sym80x14, sym128x14,<br>sym160x14, sym256x14, sym320x14, sym512x14, sym640x14, sym1024x14,<br>sym1280x14, sym2560x14, sym5120x14, sym6, sym1x12, sym2x12, sym4x12,<br>sym5x12, sym8x12, sym10x12, sym16x12, sym20x12, sym32x12,<br>sym40x12, sym64x12, sym80x12, sym128x12, sym160x12, sym256x12,<br>sym320x12, sym512x12, sym640x12, sym1280x12, sym2560x12 }, |
| configuredGrantTimer | INTEGER (1..64) |
| OPTIONAL,    -- Need R | |
| rrc-ConfiguredUplinkGrant | SEQUENCE { |
| timeDomainOffset | INTEGER (0..5119), |
| timeDomainAllocation | INTEGER(0..15), |
| frquencyDomainAllocation | BIT STRING |
| (SITE(18)), | |
| antennaPort | INTEGER (0..31), |
| dmrs-SeqInitialization | INTEGER (0..1) |
| OPTIONAL,    -- Need R | |
| precodingAndNumberOfLayers | INTEGER (0..63), |
| srs-ResourceIndicator | INTEGER (0..15) |
| OPTIONAL,    -- Need R | |
| mcsAndTBS | INTEGER (0..31), |
| frequencyHoppingOffset | INTEGER (1.. |
| maxNrofPhysicalResourceBlocks-1) | OPTIONAL,    -- Need R |
| pathlossReferenceIndex | INTEGER |
| (0..maxNrofPUSCH-PathlossReferenceRSs-1), | |
| ..., | |
| [[ | |
| pusch-RepTypeIndicator-r16 | ENUMERATED {pusch- |
| RepTypeA, pusch-RepTypeB} | OPTIONAL,    -- Need M |
| frequencyHoppingPUSCH-RepTypeB-r16 | ENUMERATED |
| {interRepetition, interSlot} | OPTIONAL,    -- Cond RepTypeB |
| timeReferenceSFN-r16 | ENUMERATED {sfn512} |
| OPTIONAL    -- Need R | |
| ] ] | |
| } | |
| OPTIONAL,    -- Need R | |
| ..., | |
| [ [ | |
| cg-RetransmissionTimer-r16 | INTEGER (1..64) |
| OPTIONAL,    -- Need R | |
| cg-minDFI-Delay-r16 | INTEGER (1..ffsValue) |
| OPTIONAL,    -- Need R Upper limit 7 FFS | |
| cg-nrofPUSCH-InSlot-r16 | INTEGER (1..ffsValue) |
| OPTIONAL,    -- Need R | |
| cg-nrofSlots-r16 | INTEGER (1..ffsValue) |
| OPTIONAL,    -- Need R | |
| cg-StartingFullBW-InsideCOT-r16 | ENUMERATED {ffs} |
| OPTIONAL,    -- Need R | |
| cg-StartingFullBW-OutsideCOT-r16 | ENUMERATED {ffs} |
| OPTIONAL,    -- Need R | |
| cg-StartingPartialBW-InsideCOT-r16 | ENUMERATED {ffs} |
| OPTIONAL,    -- Need R | |
| cg-StartingPartialBW-OutsideCOT-r16 | ENUMERATED {ffs} |
| OPTIONAL,    -- Need R | |
| cg-UCI-Multiplexing | ENUMERATED {enabled} |
| OPTIONAL,    -- Need R | |
| cg-COT-SharingOffset-r16 | INTEGER {1..ffsValue} |
| OPTIONAL,    -- Need R | |
| betaOffsetCG-UCI-r16 | INTEGER {1..ffsValue} |
| OPTIONAL,    -- Need R | |
| cg-COT-SharingList-r16 | SEQUENCE (SIZE |
| (1..ffsValue)) OF CG-COT-Sharing-r16    OPTIONAL,    -- Need R | |
| harq-ProcID-Offset-r16 | INTEGER (0..15) |
| OPTIONAL,    -- Need M | |
| harq-ProcID-Offset2-r16 | INTEGER (0..15) |
| OPTIONAL,    -- Need M | |
| configuredGrantConfigIndex-r16 | |
| ConfiguredGrantConfigIndex-r16 | OPTIONAL,    -- Need M |
| configuredGrantConfigIndexMAC-r16 | |
| ConfiguredGrantConfigIndexMAC-r16 | OPTIONAL,    -- Need M |
| periodicityExt-r16 | INTEGER (1..5120) |
| OPTIONAL,    -- Need M | |
| startingFromRV0-r16 | ENUMERATED {on, off} |
| OPTIONAL,    -- Need M | |
| phy-PriorityIndex-r16 | ENUMERATED {p0, p1} |
| OPTIONAL,    -- Need M | |

TABLE 1-continued

| Rel-16 ConfiguredGrantConfig IE in the RRC specification. |
| --- |
| autonomousReTx-r16           ENUMERATED {enabled}<br>OPTIONAL,  -- Cond LCH-BasedPrioritization<br>  ]]<br>} |

Compared to configured scheduling in NR Rel-15, a UE can trigger a retransmission autonomously using a configured want for a hybrid automatic repeat request (HARQ) process configured with autonomous uplink (AUL) when the CG retransmission timer is expired while the UE has not received HARQ feedback for the HARQ process. A timer "CG retransmission timer (CGRT)" is defined accordingly. This timer is configured by the RRC parameter cg-RetransmissionTimer in the ConfiguredGrantConfig. The CGRT is started for a HARQ process configured with AUL upon the data transmission using a configured grant, and a retransmission using another configured grant is triggered when the CGRT expires.

With this added functionality, it is beneficial for the EE to avoid the HARQ process to be stalled in case the gNB has missed the HARQ transmission initiated by the UE. However, an issue is observed that a UE may just continuously initiate autonomous HARQ retransmissions for a HARQ process for a very long time. However the gNB may not successfully receive the transport block (TB) either due to bad radio channel quality or the channel is seldom obtained due to listen-before-talk (LBT) failures. This is undesirable because the packet may become too old and any retransmission attempt further congests the channel and further affects the latency of other packets in the uplink buffer. The radio link control (RLC) layer at the UE may sooner or later trigger RLC retransmissions for a RLC protocol data unit (PDU) that is still under retransmissions in the HARQ. The retransmitted RLC PDU occupies a different HARQ process. In this case, the UE maintains two HARQ processes in transmission for the same RLC PDU. The RLC receiver at the gNB may receive two RLC PDU duplicates. This may create trouble if a wraparound of the RLC sequence number occurs. The second received RLC PDU may be treated as a new data and forwarded upward when instead the PDU should be dropped.

Therefore, it is necessary to introduce a maximum limit on AUL retransmissions of a HARQ process triggered by a UE. To address this issue, a timer is configured to indicate the maximum amount of time for the UE to complete transmission of an HARQ process, i.e., when the timer expires the UE should flush the HARQ buffer for this HARQ process and transmit new data associated to it. An existing timer configuredGrantTimer (COT) may be used for this purpose. If both COT and CG retransmission timer (CGRT) are configured for a HARQ process, both timers can be operated in parallel. In this way, the UE can perform HARQ retransmission using CG resources for a HARQ process while COT is running for the process. The value of CGT should be longer than that of CG retransmission timer. The HARQ buffer is flushed at expiry of CGT. An example of the procedure is illustrated in FIG. 2.

FIG. 2 is a timing diagram illustrating control of the maximum number of AUL retransmissions using CGT. At time to the UE performs the initial transmission of a transport block with a configured grant resource and starts both the CGT and CGRT timers. The HARQ buffers may be flushed after the expiration of the CGT interval.

A UE can be provided with multiple active configured grants for a given bandwidth part (BWP) in a serving cell. The use of multiple configured grants enhances reliability and reduces latency of critical services. In addition, applying multiple configured grants enables the UE to switch to slot-based transmissions after initiating the COT (channel occupancy time) to minimize demodulation reference signal (DMRS) and uplink control information (UCI) overhead in unlicensed spectrum.

For each CG configuration, there are a number of HARQ processes in the HARQ process pool assigned. There is also a separate CGT timer and CGRT setting associated with each CG configuration. It is allowed to share HARQ processes between CG configurations, which can give better configuration flexibility. In addition, if each CG configuration has separate associated HARQ processes, the HARQ process space may become limited for the UE.

Because a logical channel (LCH) can be mapped to multiple CG configurations, the UE can transmit the data of the LCH using multiple active CG resources at the same time. For a TB which was transmitted using a CG resource, it is allowed to use any CG resource among the set of CG resources mapped to the LCH which comes earliest in the time to perform retransmission, this can reduce the latency. In addition, the selected resource shall provide the same size as the same initial TB to avoid rate-matching on the TB. In addition, the UE shall stick to the same HARQ process for transmission/retransmission of a TB.

The CGT timer for a HARQ process shall be only started when the TB using this HARQ process is initially transmitted. The value of the COT timer is set according to the CG configuration/resource which is used for the initial transmission In parallel the CGRT shall be started/restarted and set to the timer value which is used for every transmission/retransmission attempt. If the initial transmission of a TB uses the resource in CG configuration 1, the CGRT is started using the timer value configured in CG configuration 1. The next retransmission of the TB is performed with the resource in CG configuration 2. The CGRT need to be restarted and set to the timer value configured in CG configuration 2.

The HARQ process number field in the uplink DCI (e.g., format 0-0 or format 0-1) scrambled by CS-RNTI is used to indicate which configuration is to be activated and which configuration(s) is/are to be released. In the DCI, new data indicator (NDI) in the received HARQ information is 0.

Upon reception of a activation/reactivation/deactivation command, the UE provides a confirmation MAC control element (CE) to the gNB. The MAC CE contains a bitmap of CG configurations. In the bitmap field, each bit corresponds to a specific CG configuration (i.e., the bit position corresponds to the CG index).

Repetition of a TB is also supported in NR, and the same resource configuration is used for K repetitions for a TB including the initial transmission. The higher layer configured parameters repK and repK-RV define the K repetitions to be applied to the transmitted transport block, and the redundancy version (RV) pattern to be applied to the repetitions. For the nth transmission occasion among K repetitions, n=1, 2, . . . , K, it is associated with (mod(n−1,4)+1)th value in the configured RV sequence. The initial transmission of a transport block may start at the first transmission occasion of the K repetitions if the configured RV sequence is {0,2,3,1}, any of the transmission occasions of the K repetitions that are associated with RV=0 if the configured RV sequence is {0,3,0,3}, or any of the transmission occasions of the K repetitions if the configured RV sequence is {0,0,0,0}, except the last transmission occasion when K=8.

For any RV sequence, the repetitions shall be terminated after transmitting K repetitions, or at the last transmission occasion among the K repetitions within the period P, or when an uplink grant for scheduling the same TB is received within the period P, whichever is reached first. The UE is not expected to be configured with the time duration for the transmission of K repetitions larger than the time duration derived by the periodicity P.

For both Type 1 and Type 2 PUSCH transmissions with a configured grant, when the UE is configured with repK>1, the UE shall repeat the TB across the repK consecutive slots applying the same symbol allocation in each slot. If the UE procedure for determining slot configuration, as defined in subclause 11.1 of TS 38.213, determines symbols of a slot allocated for PUSCH as downlink symbols, the transmission on that slot is omitted for multi-slot PUSCH transmission.

There currently exist certain challenges. For example, beamforming is expected to be widely applied for 50 NR operation in mm-wave bands for both transmission and reception. For uplink transmission, a spatial relation needs to be established and understood by both the UE and base station (e.g., gNB) before transmission in the uplink is conducted. A spatial relation is defined between an uplink channel/reference signal (PUSCH, PUCCH, SRS, etc.) and either a downlink reference signal (CSI-RS, synchronization symbol (SS)/physical broadcast channel (PBCH) block) or another uplink reference signal (RS). If uplink channel/signal A is spatially related to reference signal B, it means the UE should beamform A in the same way as it received/transmitted B. By establishing a spatial relation, the UE gets to know in which direction to beamform its transmission signal towards the targeted gNB, and the gNB also understands how to tune its RX beam towards the UE.

Uplink beam misalignment between gNB and OF may occur. This means that the UE is configured with a configured grant that is not valid for the current beam so the gNB will not listen to the transmission (grant) occasion and the beam direction. The gNB with analog beamforming capability can only listen to uplink transmission in one direction (per antenna panel) at a time. To solve this, the gNB can periodically sweep through all beams in the cell for periodic uplink transmission in relevant transmission occasions.

Periodic uplink transmission resources for multiple UEs can be configured in same OFDM symbol(s) by means of frequency or code multiplexing to improve resource efficiency. gNB with analog beamforming capability should multiplex periodic uplink transmission resources in the same time occasion only for UEs located in the same beam coverage area, so that the gNB can receive the periodic uplink transmissions from the UEs with the same RX beam. In other words, if there are simultaneous uplink transmissions by UEs from different directions, it would be difficult for the gNB to decode all directions due to the analog beamforming capability limitation. For configured grant based uplink transmission, a UE will not receive acknowledgement for its uplink transmissions, because the gNB may not listen to the direction at which the UE has performed transmissions. An example is illustrated in FIG. 3.

FIG. 3 is a network diagram illustrating a UE moving across beams and attempting to transmit using configured grants. When UE1 is moving around in the cell across different beam coverage areas, the gNB needs to frequently re-configure periodic uplink transmission resources for the UEs by dedicated signaling (i.e., RRC, MAC CE or DCI). However, an accurate beam alignment requires not only that the UE needs to provide CSI report in time, but also requires the gNB to send the signaling in time. This is not always feasible especially when the UE moves fast and/or there is high signaling load in the cell, see for example at t=t2, the UE has already moved to the next beam (e.g., SSB3) and the gNB may not be able to decode the data (because the antenna gain on SSB2 is too bad). Another example is shown in FIG. 4.

FIG. 4 is a network diagram illustrating two UEs sharing the same time domain resources while transmitting to the gNB on different beams. When the above cases happen, the probability of the uplink transmission not being heard by the gNB can be very high. As a consequence, the uplink transmission suffers from low reliability or high transmission latency (due to excessive re-transmissions). Therefore, for MR operation in mm-wave bands, the existing configured grant based framework is not efficient or reliable in terms of uplink beam alignment.

SUMMARY

Based on the description above, certain challenges currently exist with scheduling for beam based transmission. Certain aspects of the present disclosure and their embodiments may provide solutions to these or other challenges. For example, to overcome the problem with uplink beam misalignment between the gNB and user equipment (UE) described above, particular embodiments assign preconfigured resources used for scheduling occasions (SOs) which are mapped to a specific beam (SSB). For the scenario with many beams in a cell and moving UEs, this reduces the uplink beam misalignment and reduces the delay for uplink data transmission. An example is illustrated in FIG. 5.

FIG. 5 is a network diagram illustrating a UE using preconfigured resources, according to particular embodiments. As illustrated, UE 1 can use preconfigured resources (i.e., reserved physical resource blocks (PRBs)) for scheduling occasions for each beam (SSB) without any signaling required. The SOs are shared by all UEs in the cell (contention based) and are used for scheduling request (SR)/buffer status report (BSR) and/or small data.

In FIG. 5, UE1 is initially configured with CG which maps to SSB1. As the UE starts to move, gNb will not be able to hear the UE if it uses its CG resource, so instead it uses a shared CG which maps to the direction of the UE. The mapping of SOs to different beams ensures that the gNb will be listening/receiving in the right direction when a specific SO is used.

According to some embodiments, a method performed by a wireless device comprises obtaining an indication of an initial resource region. The initial resource region comprising time frequency resources, wherein the time frequency resources are divided into a plurality of SOs and each of the plurality of SOs is associated with an uplink beam. The method further comprises: determining the wireless device has moved out of coverage of a first beam and that uplink resources associated with the first beam should no longer be used; selecting a second beam for uplink transmission; selecting a SO associated with the second beam from the initial resource region; and transmitting an initial transmission of uplink data in the selected SO using the second beam.

In particular embodiments, selecting the second beam comprises selecting a beam based on downlink radio quality of a plurality of beams.

In particular embodiments, the uplink data includes at least one of a wireless device identifier, hybrid automatic repeat request (HARQ) process identifier, redundancy value, and modulation and coding scheme (MCS). The uplink data may include a buffer status report (BSR).

In particular embodiments, two or more SOs are associated with the same beam, and selecting a SO associated with the second beam comprises randomly selecting one of two or more SOs associated with the second beam.

In particular embodiments, the method further comprises, in response to transmitting the initial transmission, receiving a scheduling grant from the network node. The scheduling grant comprises an indication of time frequency resources not included in the initial resource region. The method further comprises transmitting uplink data in the time frequency resources indicated in the scheduling grant.

In particular embodiments, the method further comprises: determining the wireless device has moved out of coverage of the second beam and that uplink resources associated with the second beam should no longer be used; selecting a third beam for uplink transmission; selecting a SO associated with the third beam from the initial resource region; and transmitting an initial transmission of uplink data in the selected SC) using the third beam.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node comprises obtaining an indication of an initial resource region. The initial resource region comprises time frequency resources, wherein the time frequency resources are divided into a plurality of SOs and each of the plurality of SOs is associated with an uplink beam. The method further comprises: transmitting the indication of the initial resource region to one or more wireless devices; receiving an initial transmission of uplink data from a wireless device in a first SO of the plurality of SOs; and determining an uplink beam used by the wireless device for the initial uplink transmission based on the beam associated with the first SO.

In particular embodiments, the uplink data includes at least one of a wireless device identifier. HARD process identifier, redundancy value, and MCS. The uplink data may include a BSR.

In particular embodiments, the method further comprises transmitting a scheduling grant to the wireless device. The scheduling grant comprises an indication of time frequency resources not included in the initial resource region.

In particular embodiments, the method further comprises receiving a second initial transmission of uplink data from the wireless device in a second SO of the plurality of SOs and determining an uplink beam used by the wireless device for the initial uplink transmission based on the beam associated with the second SO.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, some embodiments reduce the impact of uplink beam failure or beam misalignment on beam management. Some embodiments reduce the occurrence of mis-triggering of beam failures. Some embodiments reduce the delay for uplink data transmission and/or increase reliability of uplink transmissions.

BRIEF DESCRIPTION OF THE DRAWINGS

For a more complete understanding of the disclosed embodiments and their features and advantages, reference is now made to the following description, taken in conjunction with the accompanying drawings, in which:

FIG. 7 is a network diagram illustrating SSB beams and their associated TA values:

FIG. 10 is flowchart illustrating an example method in a wireless device, according to certain embodiments:

FIG. 11 is flowchart illustrating an example method in a network node, according to certain embodiments;

DETAILED DESCRIPTION

Figure 1:
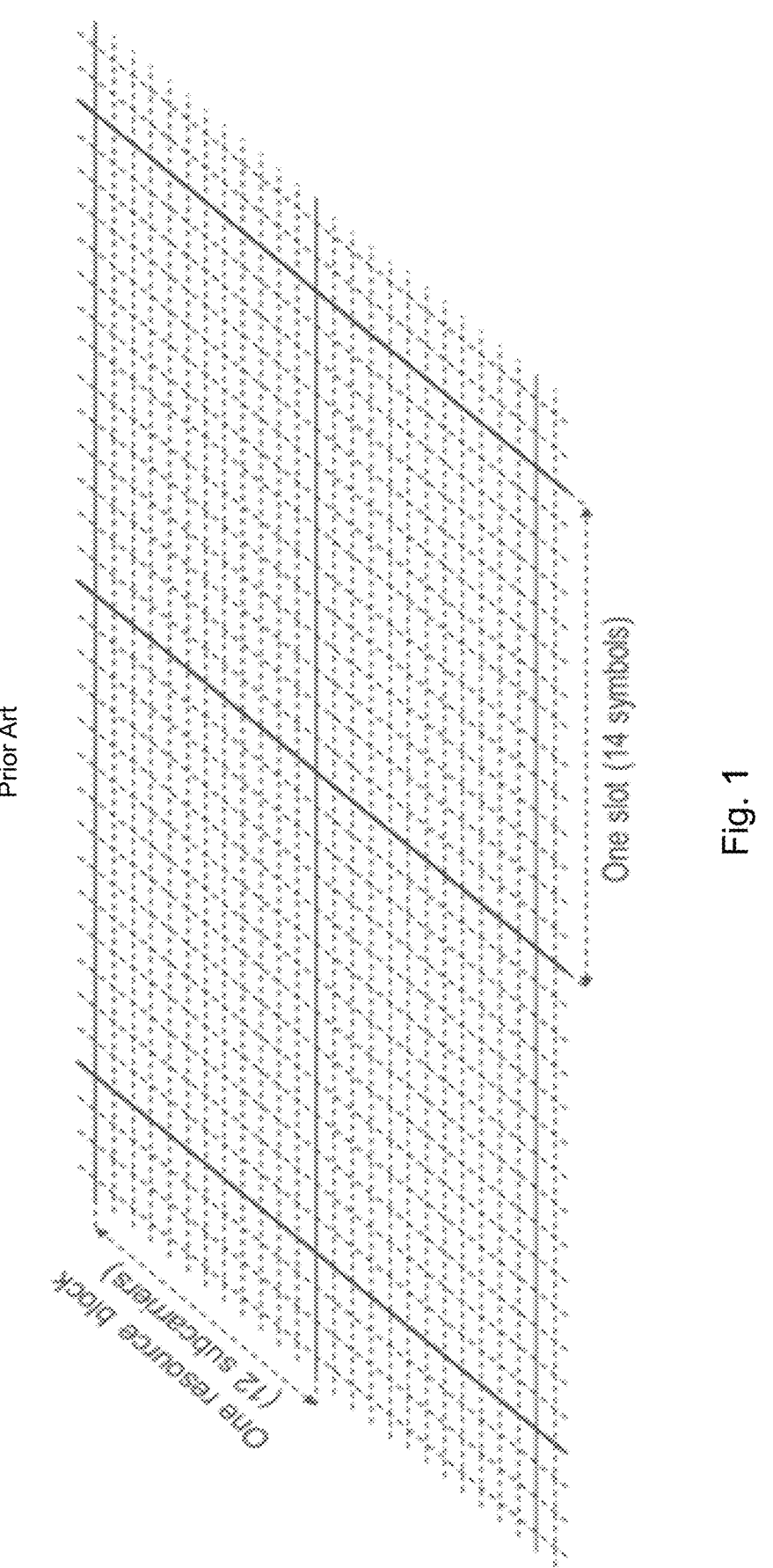
FIG. 1 illustrates the new radio (NR) physical resource grid.
Figure 2:
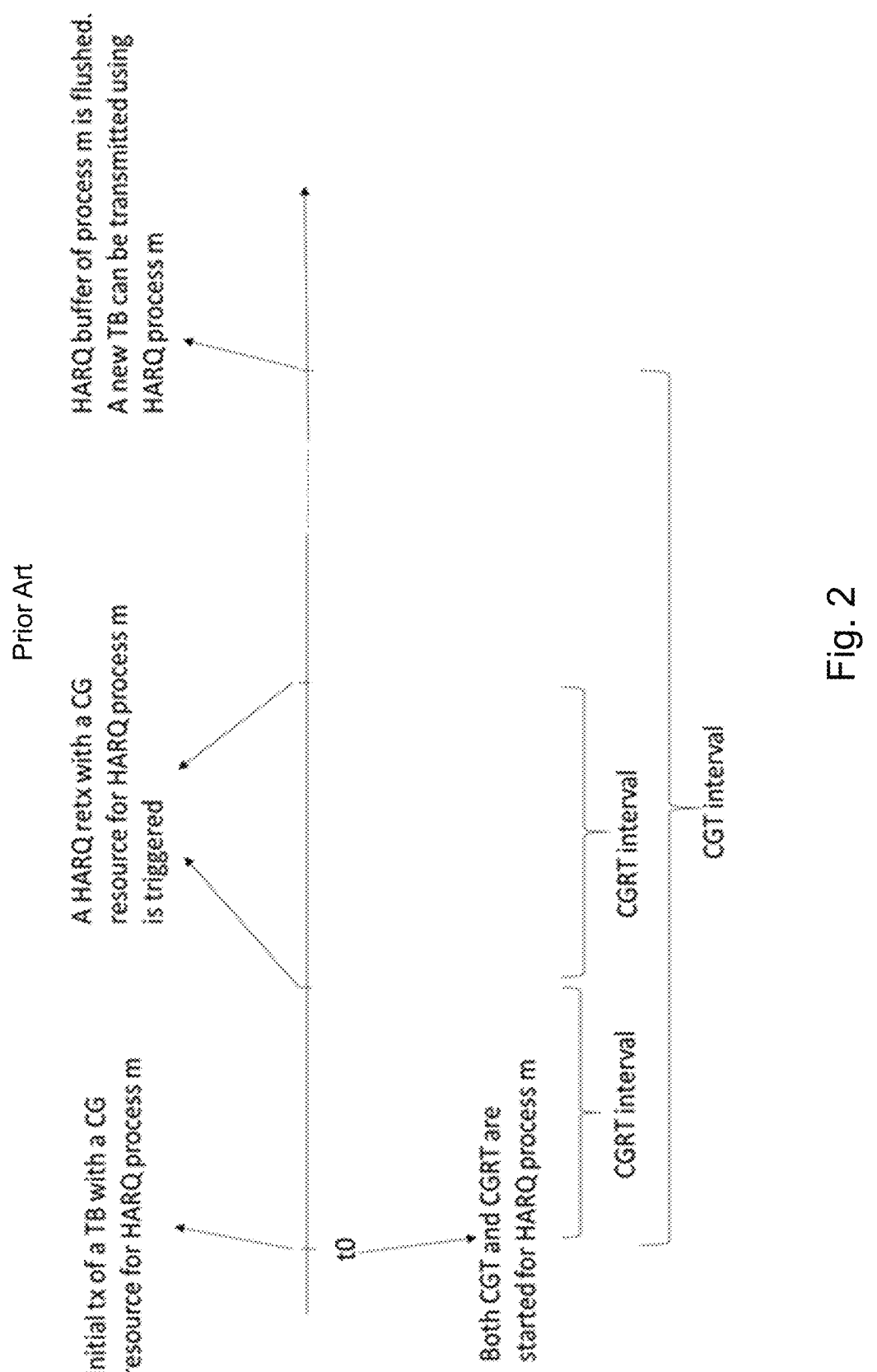
FIG. 2 is a timing diagram illustrating control of the maximum number of autonomous uplink (AUL) retransmissions using configured grant timer (CGT)
Figure 3:
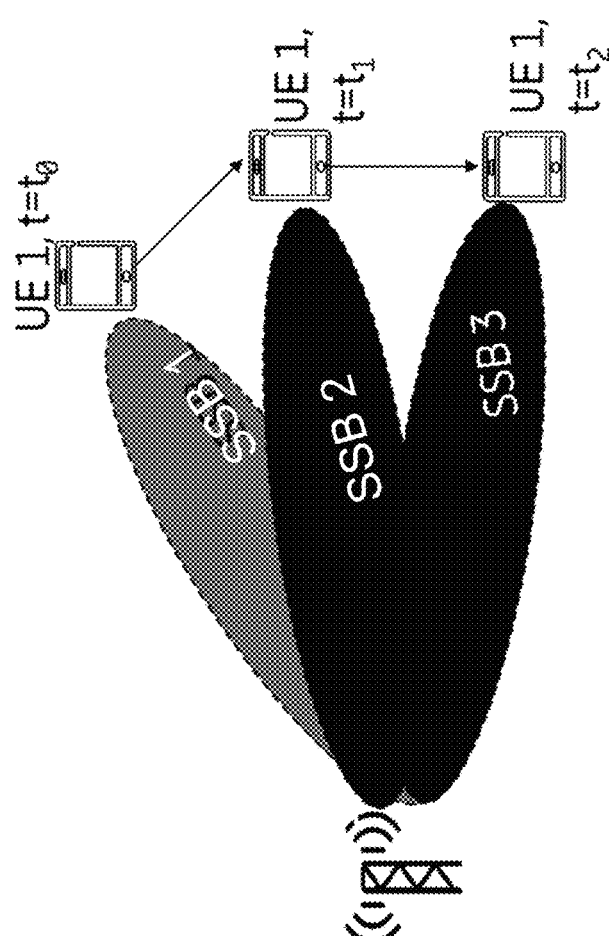
FIG. 3 is a network diagram illustrating a user equipment WE) moving across beams and attempting to transmit using configured grants.
Figure 4:
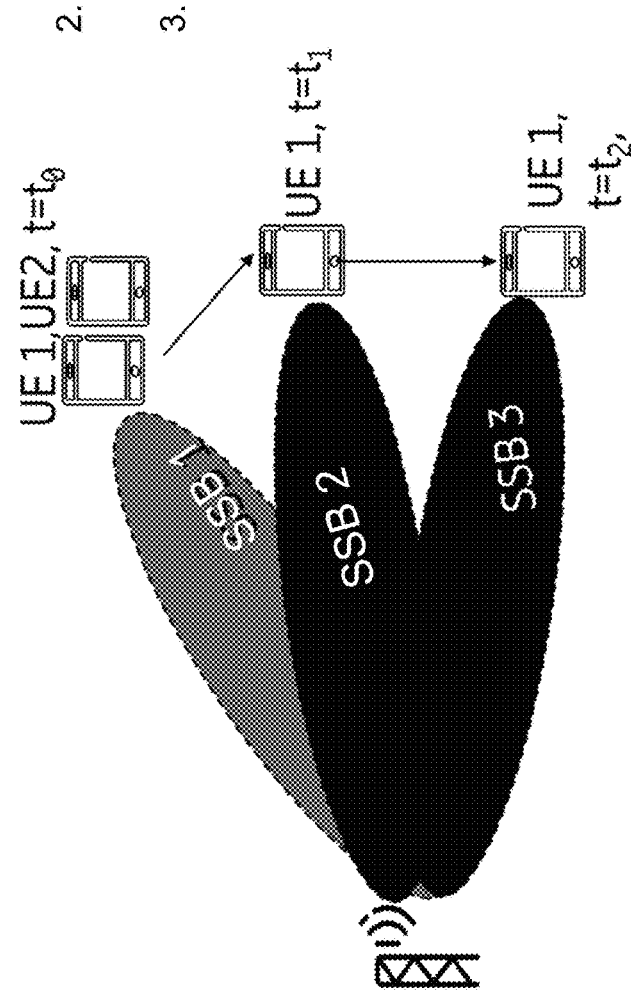
FIG. 4 is a network diagram illustrating two UEs sharing the same time domain resources while transmitting to the gNB on different beams.
Figure 5:
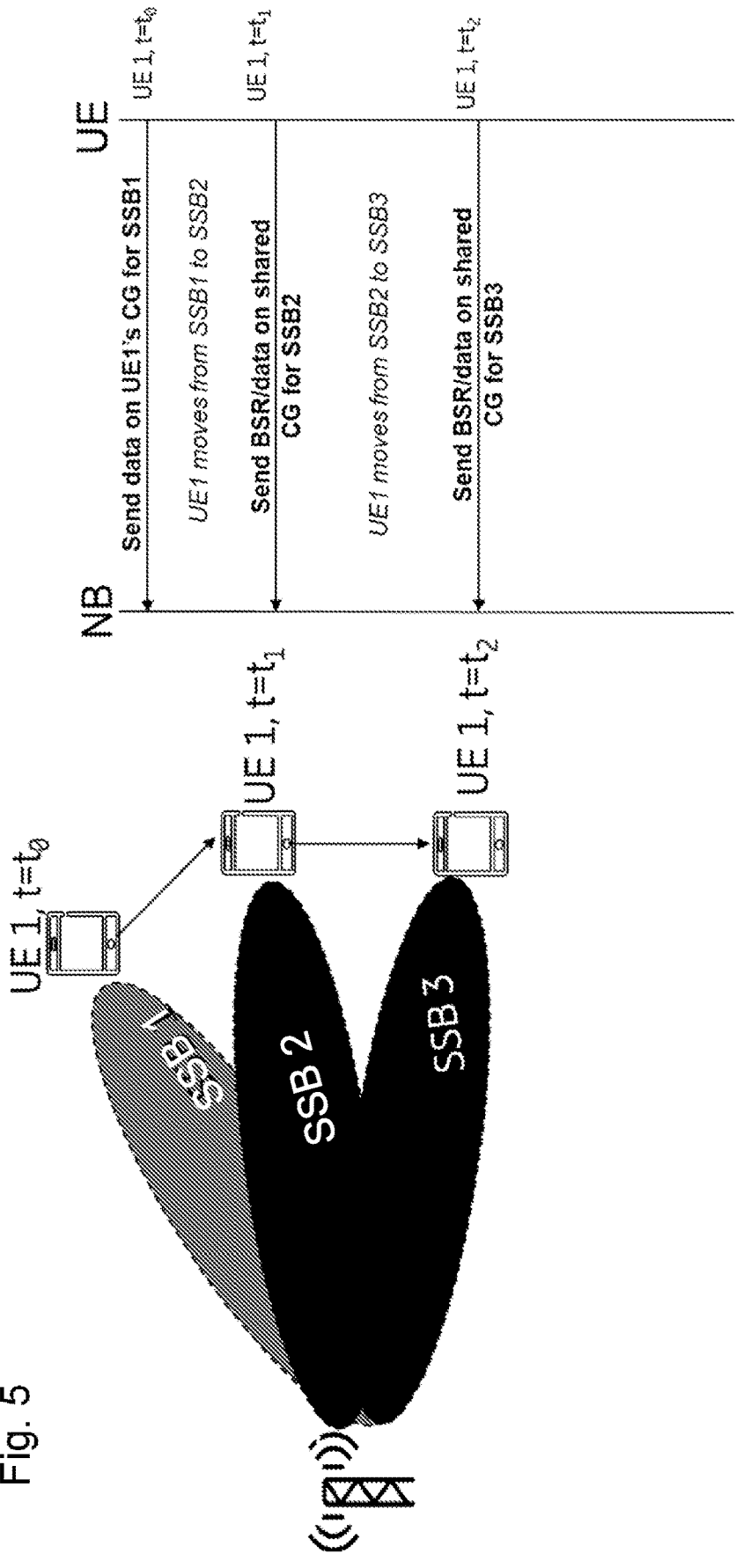
FIG. 5 is a network diagram illustrating a UE using preconfigured resources, according to particular embodiments.

As described above, certain challenges currently exist with scheduling for beam based transmission. Certain aspects of the present disclosure and their embodiments may provide solutions to these or other challenges. For example, to overcome the problem with uplink beam misalignment between the gNB and UE described above, particular embodiments assign preconfigured resources used for scheduling occasions (SOs) which are mapped to a specific beam (SSB).

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments described herein are applicable to both licensed and unlicensed operations. The term "BWP segment" is used herein to represent a segment of a bandwidth part (BWP), which is a set of consecutive PRBs. A BWP may be composed of multiple BWP segments. The other similar terms such as "channel" or "subband" are equally applicable here. The embodiments described herein are not limited by the terms.

In a first group of embodiments, a set of configured resources are configured for a BWP segment/BWP/cell/carrier/cell(carrier) group. The resources are shared by all UEs served in the same BWP segment/BWP/carrier/cell (carrier) group. The resources are signaled to UEs via at least one of system information, dedicated RRC signaling, MAC CE, DCI, or any other suitable signaling.

The set of resources may be configured in a specific region (e.g., spanning in specific time positions and/or specific frequency positions). As a non-limiting example, the region is referred to as initial region.

In some embodiments, the initial region is divided into many scheduling occasions (SOs). A SO is an area specified in time and frequency domain that is available for the reception of scheduling information such as BSR and GE identifier and possibly small amount of data from a UE, in an example, an SO spans s PRBs/sub carriers in frequency and z OFDM symbols in time.

SOs are associated with SSBs and/or CSI-RSs. Therefore, a mapping relation is defined/configured between SOs and SSBs or CSI-RSs. Alternatively, SOs are associated with spatial relations. The purpose of the mapping/association is to define the direction the gNb is listening/receiving for the SO. Therefore, a mapping relation is defined/configured between SOs and spatial relations.

As a non-limiting example, the overall mapping logic is described as follows. First, in increasing order of frequency resource indexes for frequency multiplexed SOs. Second, in increasing order of time resource indexes for time multiplexed SOs within a scheduling slot assuming a scheduling slot contains multiple SC) occasions in time). Third, in increasing order of indexes for scheduling slots.

A scheduling slot is configured in the time domain to contain multiple SO occasions in time. A scheduling slot may be equal to a normal slot, or X OFDM symbols in time.

A UE supporting uplink transmission based on configured resources can use selected configured resources to perform uplink transmissions.

Figure 6:
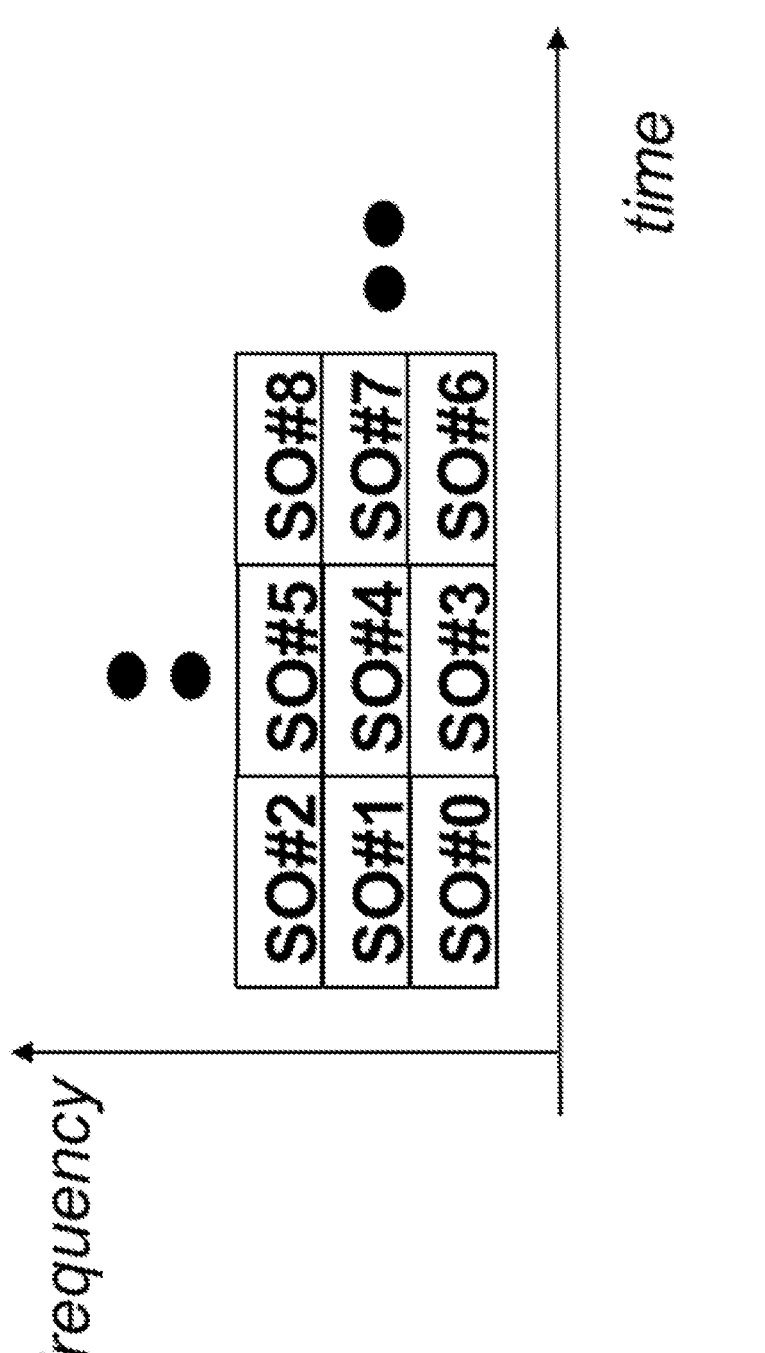
FIG. 6 is a time-frequency diagram illustrating an example of an initial region containing scheduling occasions (SOs)

An example of the resource region for SOs is illustrated in FIG. 6.

FIG. 6 is a time-frequency diagram illustrating an example of an initial region containing SOs. The horizontal axis represents time and the vertical axis represents frequency.

The initial region is configured to contain a fixed number of SOs in frequency. In addition. SOs may have the same or different time durations. SOs may be consecutively or non-consecutively distributed in frequency and in time. The mapping relation between SOs and SSBs or CSI-RSs can be one to one, one to many or many to one.

In a second group of embodiments, the UE continuously measures downlink radio quality such as RSRP, RSRQ, SINR, RSSI, channel occupancy, LBT/CCA failure statistics (such as failure counter, or failure ratio) etc. of the reference SSBs or CSI-RSs. Based on the measurement result, the UE may choose one or multiple configured resources associated with the preferred SSBs or CSI-RSs for PUSCH transmission, while ignoring the configured resources associated with other SSBs or CSI-RSs.

The UE may apple at least one of the following options to select the preferred SSBs or CSI-RSs. In one option, at least one threshold in terms of the above mentioned quantities such as received power (i.e., L1-RSRP), RSRQ, SINK, RSSI, channel occupancy, LBT/CCA failure statistics (such as failure counter, or failure ratio) etc. is used by the UE to select the preferred SSB or CSI-RS. In a first step, the UE first selects the ones which have measured quality above the configured threshold. In a second step, the UE may select any one from the ones selected from the first step. Alternatively, the UE selects strongest one from the set selected from the first step.

In one option, the UE selects only the SSB or CSI-RS with strongest radio quality. If there is no SSB or CSI-RS with the measured quality meeting the threshold, UE selects any SSB or CSI-RS.

In one option, the UE may select the SSB or CSI-RS based on more than one measurement quantities. The UE may, select SSBs or CSI-RSs if all measurement quantities have met the thresholds. Alternatively, the UE first selects a set of SSBs or the CSI-RSs with strongest measurements in terms of a first measurement quantity. Second, the UE selects the SSBs or the CSI-RSs with strongest measurements in terms of a second measurement quantity within the set.

After selection of the preferred SSBs or CSI-RSs, the UE selects the corresponding configured resources to transmit the PUSCH. To avoid potential collision between different UEs, the UE may randomly select the resource from the set of resources which are associated with the selected preferred SSBs or CSI-RSs.

In a third group of embodiments, in the set of configured resources configured for a BWP segment/BWP/cell/carrier/cell/carrier) group, the UE selects resources to directly perform its initial uplink transmissions (e.g., the first N transmissions, N may be configured) without sending a SR or BSR to request those resources.

Because the resources may be shared by multiple UEs, the UE may experience collision that leads to transmission failure. The initial transmissions are mainly designed for at least one of the following purposes.

One purpose is to enable a UE to send its information of buffer status or scheduling request reliably and quickly. The BSR may be sent if UEs buffer status is above a threshold or if the size of the CG is small. Another purpose is to enable a UE to send small data directly using selected configured resources without asking for resource allocation.

Therefore, the initial ration may be configured to contain a small portion of resource regions. In addition, the data volume by the initial transmissions may be sufficiently small.

In the initial transmissions, the transmitting UE may indicate its identity to the gNB. Therefore, for every initial transmission, an UCI can be multiplexed into the PUSCH. At least one of the below information may be indicated in the UCI, for example, UE ID, HARQ process ID, RV value, and/or MCS.

The UE may also indicate its identity in the payload (PUSCH). The UE may also include a BSR MAC CE in the transmission regardless if there is a corresponding BSR event triggered, to inform the gNB of its current buffer status.

In a fourth group of embodiments, upon reception of the initial transmission from a UE, the gNB first decodes the UE ID and therefore knows who is transmitting. Based on reception of the BSR, the gNB can also learn buffer status of the UE. Thereafter, the gNB can do a finer scheduling to the UE, providing the UE with dynamic grants or configured grants. Upon reception of those grants, the UE stops to transmit using resources selected from the initial region, instead. UE uses those grants to further transmit data. If the reception of the initial transmission contains a BSR, the gNB can also update its buffer status of the UE.

FIG. 7 is a network diagram illustrating an example of the initial transmission procedure for a UE. As UE1 moves from SSB1 to SSB2 and SSB3, UE1 selects a suitable beam and an associated SO for an initial transmission using the selected beam.

In a fifth group of embodiments, the UE may experience collision during initial transmissions. To increase the transmission reliability, the UE may be configured with autonomous retransmissions/repetitions for the initial transmissions. The UE is allowed to initiate autonomous retransmissions for a TB, using the same or different resources. For a TB, the autonomous retransmissions may be up to a configured number or a configured time period. The retransmissions may be consecutively or separated distributed in time.

When the initial transmission is successfully received by the gNB, it will provide an acknowledgement carrying the identified UE Id associated with the reception. The UE stops autonomous retransmission when an acknowledgement is received.

In an example, UE ID is C-RNTI of the UE. In this case, the gNB may reply with a DCI addressed to UE's C-RNTI for acknowledgement.

In a sixth group of embodiments, upon reception of the initial transmission, the gNB performs scheduling to the UE. The corresponding resource assignment may be located in a different resource region from the initial region. For every subsequent transmission using these resources, the UE can skip the UCI in the PUSCH.

In a seventh group of embodiments, when the gNB receives the initial transmission from a UE, the gNB reconfigures the UE with a new CG which matches the SSB/CSI-RS indicated by the SO used for the initial transmission. As an alternative, it reconfigures the UE with a new CG when the UE has performed a specified number of transmissions on the shared resource indicating the same SSB/CSI-RS.

Figure 8:
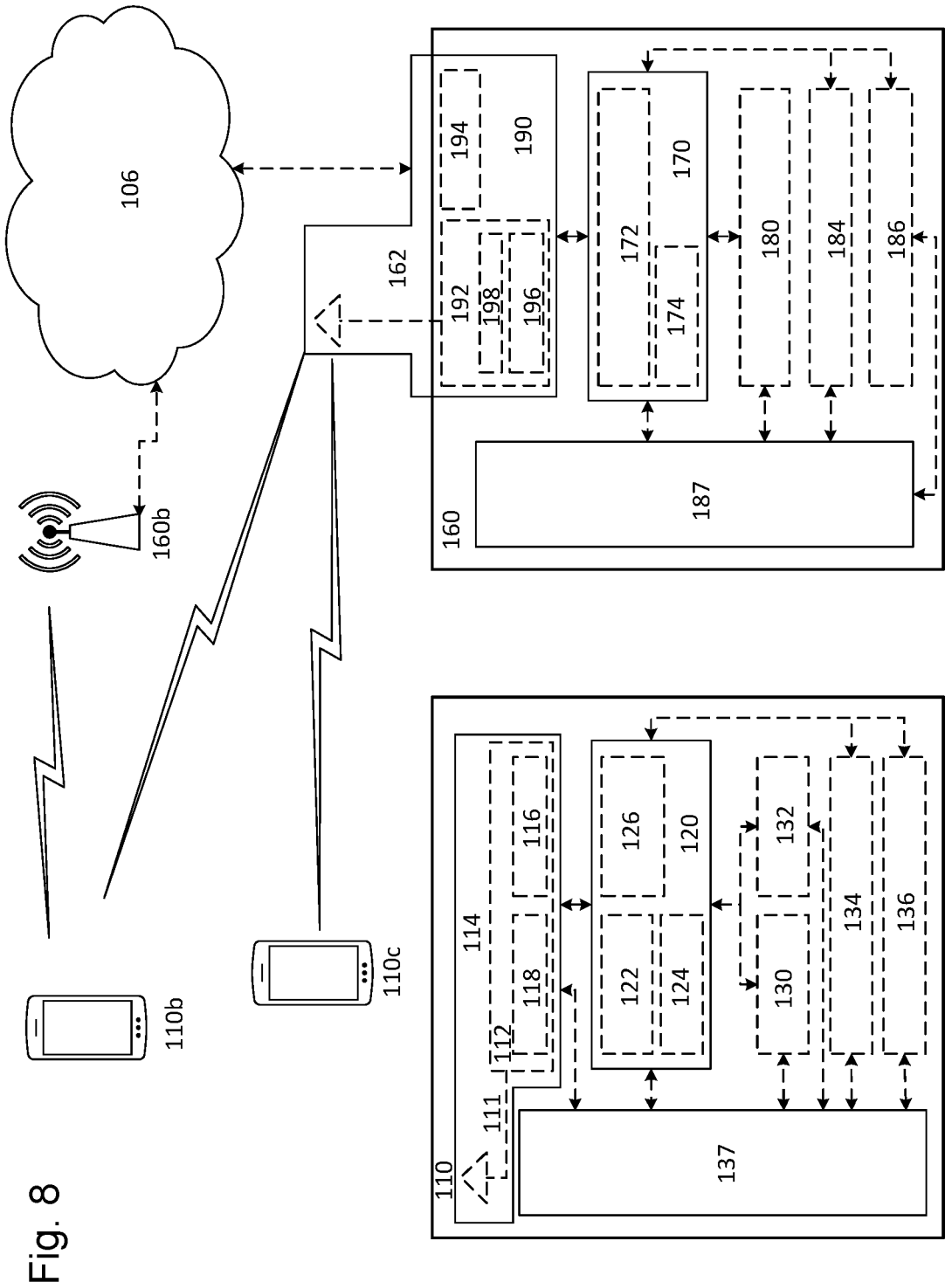
FIG. 8 is a block diagram illustrating an example wireless network.

FIG. 8 illustrates an example wireless network, according to certain embodiments. The wireless network may comprise and/or interface with any type of communication, telecommunication, data, cellular, and/or radio network or other similar type of system In some embodiments, the wireless network may be configured to operate according to specific standards or other types of predefined rules or procedures. Thus, particular embodiments of the wireless network may implement communication standards, such as Global SL stem for Mobile Communications (GSM), Universal Mobile Telecommunications System (UMTS), Long Term Evolution (LTE), and/or other suitable 2G, 3G, 4G, or 50 standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more for all) parts of a distributed radio base station such as centralized digital units and/or remote radio units (RRU), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices, capable, configured, arranged, and/or operable to enable and/or provide a wireless device with access to the wireless network or to provide some service to a wireless device that has accessed the wireless network.

In FIG. 8, network node 160 includes processing circuitry 170, device readable medium 180, interface 190, auxiliary equipment 184, power source 186, power circuitry 187, and antenna 162. Although network node 160 illustrated in the example wireless network of FIG. 8 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, MR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the carious wireless features, functions or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry. 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may, comprise any form of volatile or non-volatile computer readable memory including, without limitation, persistent storage solid-state memory, remotely mounted memory, magnetic media, optical media, random access memory (RAM), read-only memory (ROM), mass storage media (fir example, a hard disk), removable storage media (for example, a flash drive a Compact Disk (CD) or a Digital Video Disk (DVD)), and/or any other volatile or non-volatile, non-transitory device readable and/or computer-executable memory devices that store information, data, and/or instructions that may, be used by processing circuitry 170. Device readable medium 180 may store any suitable instructions, data or information, including a computer program, software an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises ports)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiment, all or some of RF transceiver circuitry 172 may be considered a part of interface 190. In still other embodiments, interface 190 may include one or more ports or terminals 194, radio front end circuitry 192, and RF transceiver circuitry 172, as part of a radio, unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly In some embodiments, antenna 162 may comprise one or more Omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any, receiving operations and/or certain obtaining operations described herein as being performed by a network node. Any information, data and/or signals may be received from a wireless device, another network node and/or any other network equipment. Similarly antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or batter pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 8 that may be responsible for providing certain aspects of the network node's functionality, including any of the functionality described herein and/or any, functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example in an Internet of Things (IoT) scenario a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MN device. As one example, the WD may be a UE implementing the 3GPP narrow band Internet of things (NB-IoT) standard. Examples of such machines or devices are sensors, metering devices such as power meters industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may, be configured to perform any receiving or transmitting operations described herein as being performed by a WD. Any information, data and/or signals may be received from a network node and/or another WD. In some embodiments, radio front end circuitry and/or antenna III may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna III and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry, 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other WD 110 components, such as device readable medium 130. WD 110 functionality. Such functionality may include providing any of the various wireless features or benefits discussed herein. For example, processing circuitry 120 may execute instructions stored in device readable medium 130 or in memory within processing circuitry 120 to provide the functionality, disclosed herein.

As illustrated, processing circuitry 120 includes one or more of RF transceiver circuitry. 122, baseband processing circuitry 124, and application processing circuitry 126. In other embodiments, the processing circuitry may, comprise different components and/or different combinations of components. In certain embodiments processing circuitry 120 of WD 110 may comprise a SOC. In some embodiments. RF transceiver circuitry 122 baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry. 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry. 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WI) 110, but are enjoyed by WI) 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may, be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many ferns, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 114 is a smart phone, the interaction may be via a touch screen; if WD 110 is a smart meter, the interaction may, be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WI) 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may, not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 106, network nodes 160 and 160*b*, and WDs 110, 110*b*, and 110*c*. In practice, a wireless network may, further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 9:
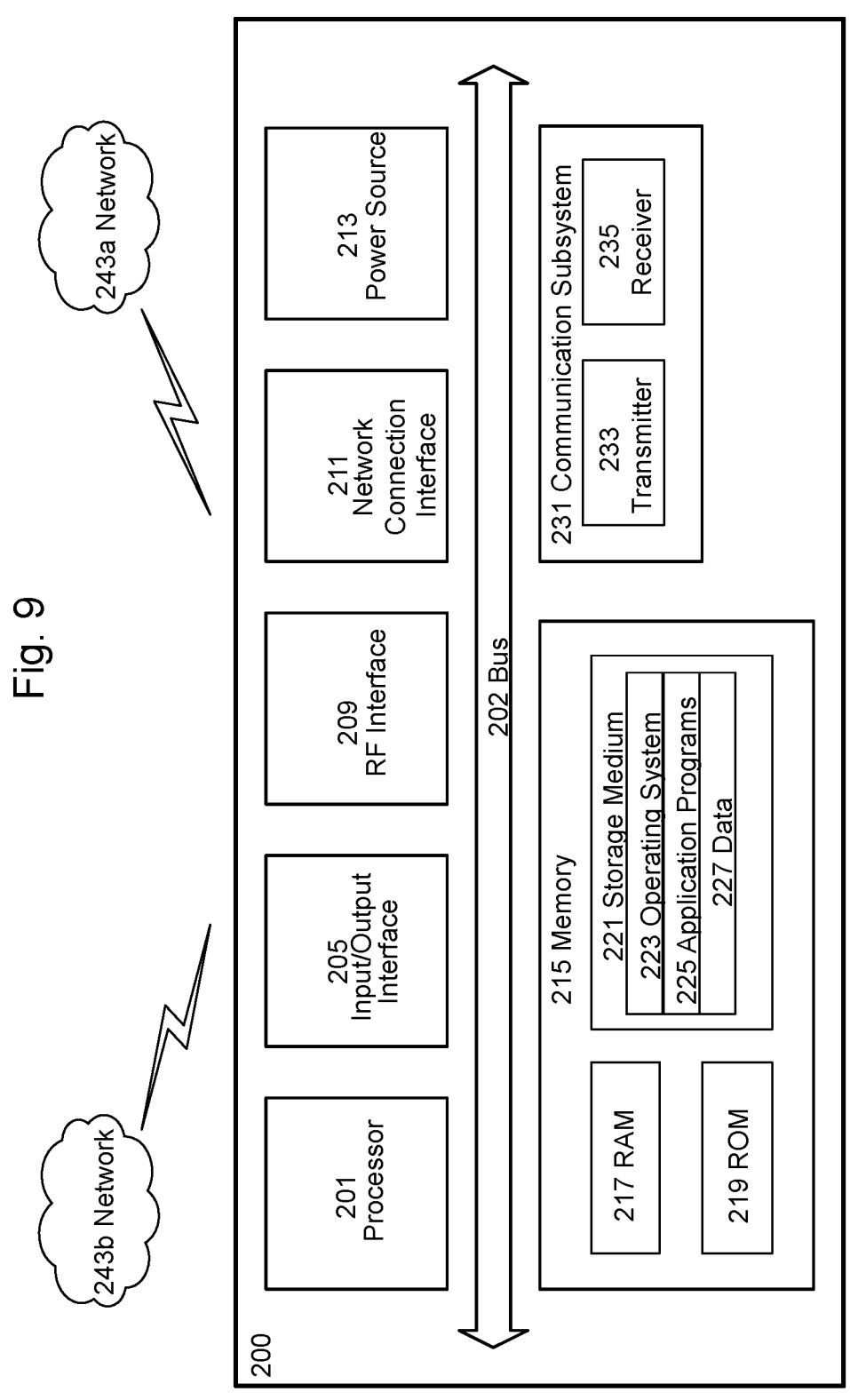
FIG. 9 illustrates an example user equipment, according to certain embodiments.

FIG. 9 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. TAE 200, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WI) and UE may be used interchangeable. Accordingly, although FIG. 9 is a UE, the components discussed herein are equally applicable to a WD, and vice-versa.

In FIG. 9, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 121 includes operating system 223, application program 225, and data 227. In other embodiments, storage medium 221 may include other similar types of information. Certain UEs may use all the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a micropro-cessor or Digital Signal Processor (DSP), together with appropriate software, or any combination of the above. For example the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker a sound card, a video card, a display, a monitor a printer, an actuator, an emitter, a smartcard, another output device, or any combination thereof.

UE 200 may be configured to use an input device via input/output interface 205 to allow a user to capture infor-mation into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resis-tive touch sensor to sense input from a user. A sensor may be, for instance, an accelerometer, a gyroscope, a tilt sensor, a force sensor, a magnetometer, an optical sensor, a prox-imity sensor, another like sensor, or any combination thereof. For example, the input device may be an acceler-ometer, a magnetometer, a digital camera, a microphone, and an optical sensor.

In FIG. 9, RF interface 209 may be configured to provide a communication interface to RF components such as a transmitter, a receiver, and an antenna. Network connection interface 211 may be configured to provide a communication interface to network 243*a* Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Net-work connection interface 211 may implement receiver and transmitter functionality appropriate to the communication network links (e.g., optical, electrical, and the like). The transmitter and receiver functions may share circuit compo-nents, software or firmware, or alternatively may be imple-mented separately.

RAM 217 may be configured to interface via bus 202 to processing circuitry 201 to provide storage or caching of data or computer instructions during the execution of soft-ware programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM. ROM, programmable read-only memory (PROM), erasable programmable read-only memory (EPROM), electrically erasable programmable memory (EEPROM), magnetic disks, optical disks, floppy disks, hard disks, removable cartridges, or flash drives. In one example, storage medium 221 may be con-figured to include operating system 223, application pro-gram 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density, digital versatile disc (HD-DVD) optical disc drive, internal hard disk drive, Blu-Ray optical disc drive, holographic digital data storage (HDDS) optical disc drive, external mini-dual in-line memory mod-ule (DIMM), synchronous dynamic random access memory (SDRAM), external micro-DIMM SDRAM, smartcard memory such as a subscriber identity, module or a remov-able user identity (SIM/RUIM) module, other memory, or any combination thereof. Storage medium 221 may allow UE 200 to access computer-executable instructions, appli-cation programs or the like, stored on transitory or non-transitory memory media, to off-load data, or to upload data. An article of manufacture, such as one utilizing a commu-nication system may be tangibly embodied in storage medium 221, which may comprise a device readable medium.

In FIG. 9, processing circuitry 201 may be configured to communicate with network 243*b* using communication sub-system 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of w ireless communication such as another WD, UE, or base station of a radio access network (RAN) according to one or more communication protocols such as IEEE 802.2, CDMA, WC DMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alterna-tively may be implemented separately.

In the illustrated embodiment, the communication func-tions of communication subsystem 231 may include data communication, voice communication, multimedia commu-nication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 2133 may, be configured to provide alternating current (AC) or direct current (DC) power to components of UE 200.

The features, benefits and/or functions described herein may be implemented in one of the components of UE 200 or partitioned across multiple components of U E 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

FIG. 10 is a flowchart illustrating an example method in a wireless device, according to certain embodiments. In particular embodiments, one or more steps of FIG. 10 may be performed by wireless device 110 described with respect to FIG. 8.

The method may begin at step 1012, where the wireless device (e.g., wireless device 110) obtains an indication of an initial resource region. The initial resource region comprises time frequency resources. The time frequency resources are divided into a plurality of SOs and each of the plurality of SOs is associated with an uplink beam. The SOs may be used by the wireless device for uplink transmission.

At step 1014, the wireless device determines the wireless device has moved out of coverage of a first beam and that uplink resources associated with the first beam should no longer be used. For example, the wireless device may have been using a configured grant on a first beam. When the wireless device moves out of coverage of the first beam, the wireless device can no longer use the configured grant. The wireless device needs to find a new beam.

At step 1016, the wireless device selects a second beam for uplink transmission. In some embodiments, selecting the second beam comprises selecting a beam based on downlink radio quality of a plurality of beams.

At step 1018, the wireless device selects a SO associated with the second beam from the initial resource region. In some embodiments, a beam may be associated with more than one SO. The wireless device may randomly select one of two or more SOs associated with the second beam. The random selection may reduce the chances of two wireless devices using the same beam selecting the same SO.

At step 1020, the wireless device transmits an initial transmission of uplink data in the selected SO using the second beam. In particular embodiments, the uplink data includes at least one of a wireless device identifier, HARQ process identifier, redundancy value, and MCS. The uplink data may include a BSR.

A particular advantage is that the wireless device can quickly transmit small amounts of uplink data when transitioning to a new beam. If the wireless device has more uplink data to transmit, the method continues to step 1022.

In response to transmitting the initial transmission at step 1022 the wireless device may receive a scheduling grant from the network node. The scheduling grant comprises an indication of time frequency resources not included in the initial resource region. For example, the wireless device may be provided with a configured or dynamic grant for transmitting the remaining or future uplink data. At step 1024, the wireless device transmits uplink data in the time frequency resources indicated in the scheduling grant.

Each time the wireless device moves out of the coverage of a beam, the wireless device may repeat some or all of steps 1014-1024 as needed.

Modifications, additions, or omissions may be made to method 1000 of FIG. 10. Additionally, one or more steps in the method of FIG. 10 may be performed in parallel or in any suitable order.

FIG. 11 is a flowchart illustrating an example method in a network node, according to certain embodiments. In particular embodiments, one or more steps of FIG. 11 may be performed by network node 160 described with respect to FIGURE K.

The method may begin at step 1112 where the network node (e.g., network node 160) obtains an indication of an initial resource region. The initial resource region comprises time frequency resources. The time frequency resources are divided into a plurality of SOs and each of the plurality of SOs is associated with an uplink beam. The SOs may be used by the wireless device for uplink transmission.

At step 1114, the network node transmits the indication of the initial resource region to one or more wireless devices. When a wireless device moves to a new beam, the wireless device may select one of the SOs associated with the beam for uplink transmission.

At step 116, the network node receives an initial transmission of uplink data from a wireless device in a first SO of the plurality of SOs. In particular embodiments, the uplink data includes at least one of a wireless device identifier, HARQ process identifier, redundancy value, and MCS. The uplink data may include a BSR.

At step 1118, the network node determines an uplink beam used by the wireless device for the initial uplink transmission based on the beam associated with the first SO.

If the wireless has or will have more uplink data to transmit, the method continues to step 1120, where the network node transmits a scheduling grant to the wireless device. The scheduling grant comprises an indication of time frequency resources not included in the initial resource region.

As wireless devices move within the cell, some or all of steps 1116-1120 may be repeated as needed.

Modifications, additions, or omissions may be made to method 1100 of FIG. 11. Additionally, one or more steps in the method of FIG. 11 may be performed in parallel or in any suitable order.

Figure 12:
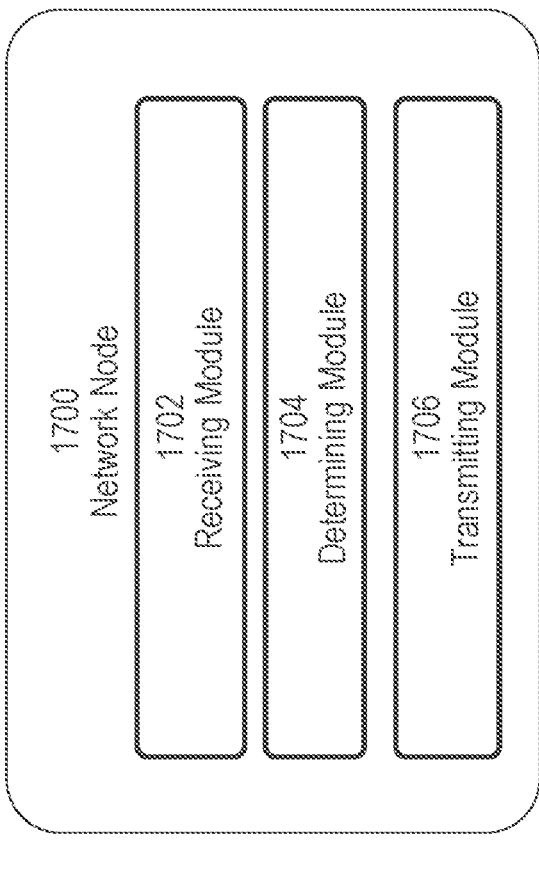
FIG. 12 illustrates a schematic block diagram of a wireless device and a network node in a wireless network, according to certain embodiments.

FIG. 12 illustrates a schematic block diagram of two apparatuses in a wireless network (for example, the wireless network illustrated in FIG. 8). The apparatuses include a wireless device and a network node (e.g., wireless device 110 and network node 160 illustrated in FIG. 8) Apparatuses 1600 and 1700 are operable to carry out the example methods described with reference to FIGS. 10 and 11, respectively, and possibly any other processes or methods disclosed herein. It is also to be understood that the methods of FIGS. 10 and 11 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 12, apparatus 1600 includes receiving module 1602 configured to receive an indication of an initial resource region according to any of the embodiments and examples described herein. Determining module 1604 is configured to determine a beam and scheduling occasion according to any of the embodiments and examples described herein. Transmitting module 1606 is configured to transmit uplink data, according to any of the embodiments and examples described herein.

As illustrated in FIG. 12, apparatus 1700 includes receiving module 1702 configured to receive uplink data according to any of the embodiments and examples described herein. Determining module 1704 is configured to determine beams associated with a scheduling occasion according to any of the embodiments and examples described herein. Transmitting module 1706 is configured to transmit an indication of an initial resource region and scheduling grants, according to any of the embodiments and examples described herein.

Figure 13:
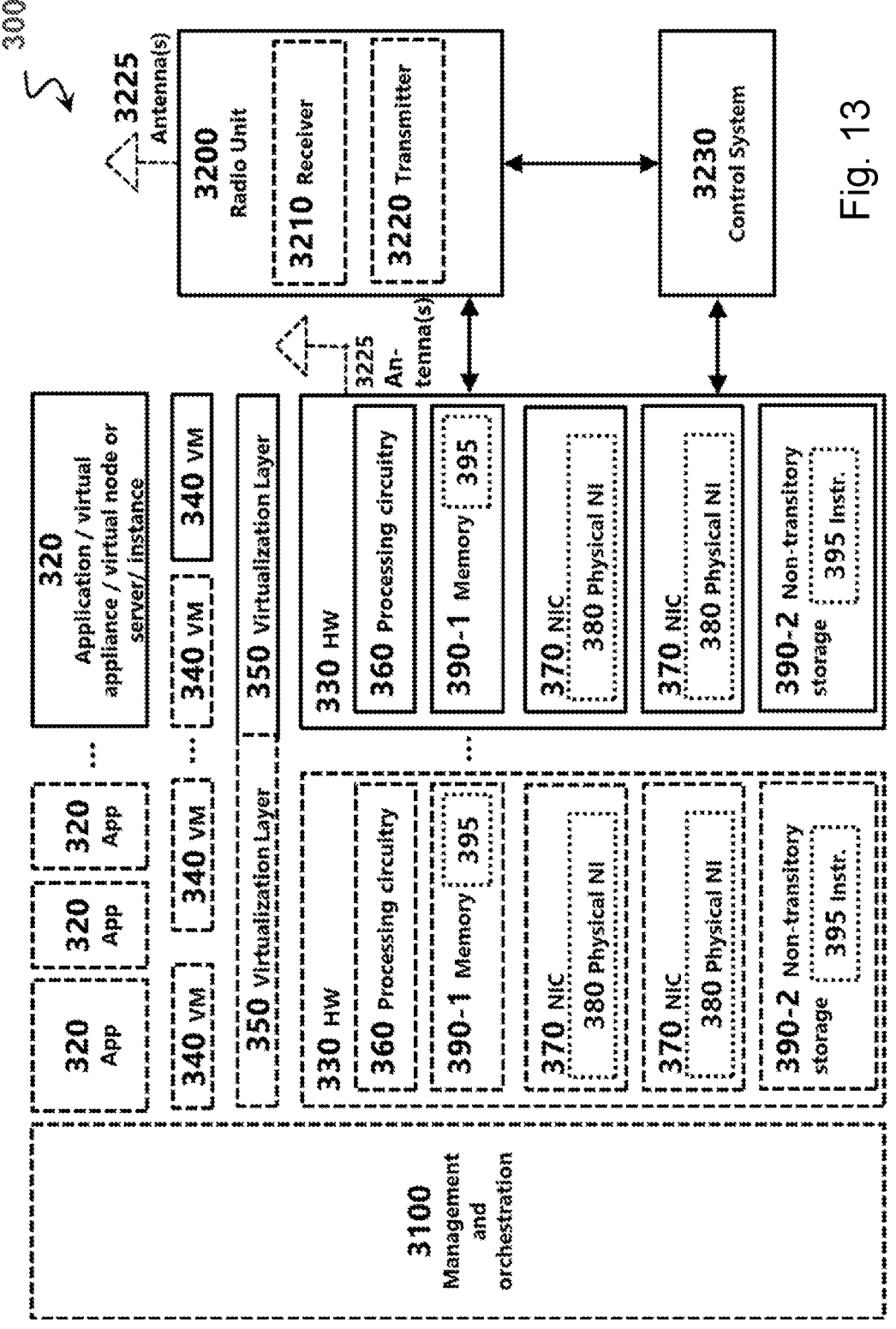
FIG. 13 illustrates an example virtualization environment, according to certain embodiments.

FIG. 13 is a schematic block diagram illustrating a virtualization environments 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions virtual nodes, virtual network functions, etc.) operative to implement some of the features, functions, and/or benefits of some of the embodiments disclosed herein. Applications 320 are run in virtualization environment 300 which provides hardware 330 comprising processing circuitry. 360 and memory 390. Memory 390 contains instructions 393 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software are 395 and/or instructions executable by processing circuitry 360. Software are 395 may include any type of software including software for instantiating one or more virtualization lasers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 13, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANIC)) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 18:
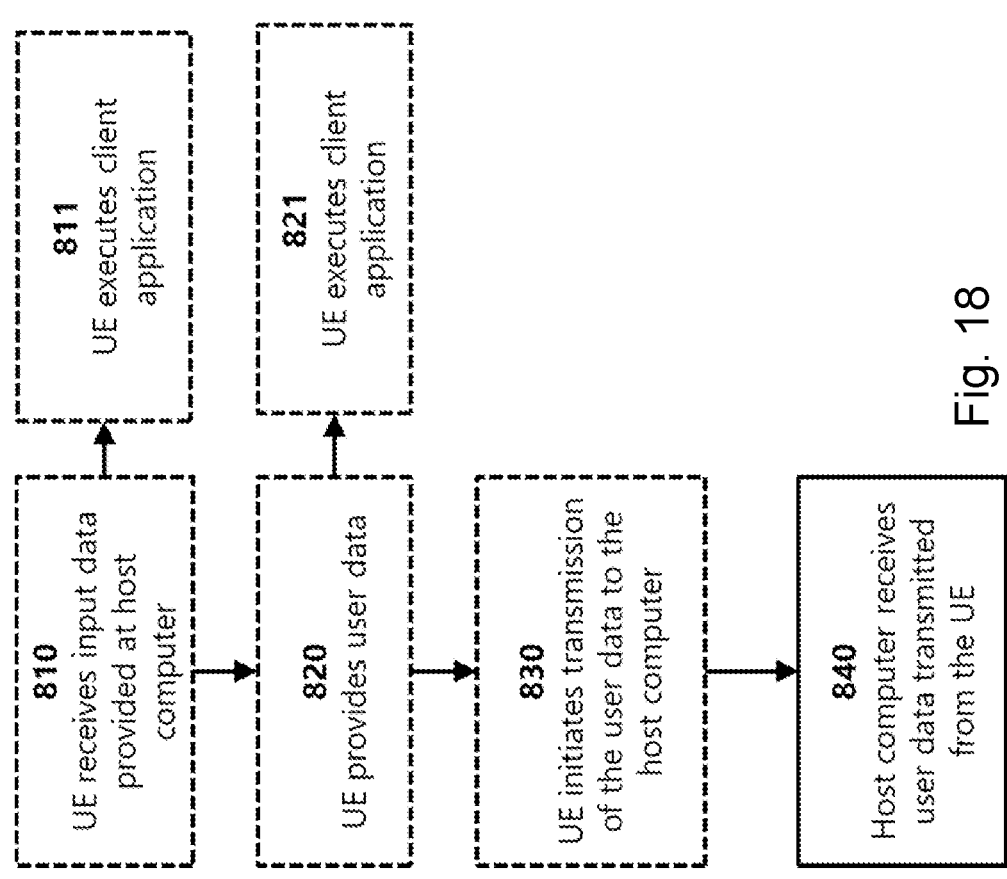
FIG. 18 is a flowchart illustrating a method implemented in a communication system, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 14:
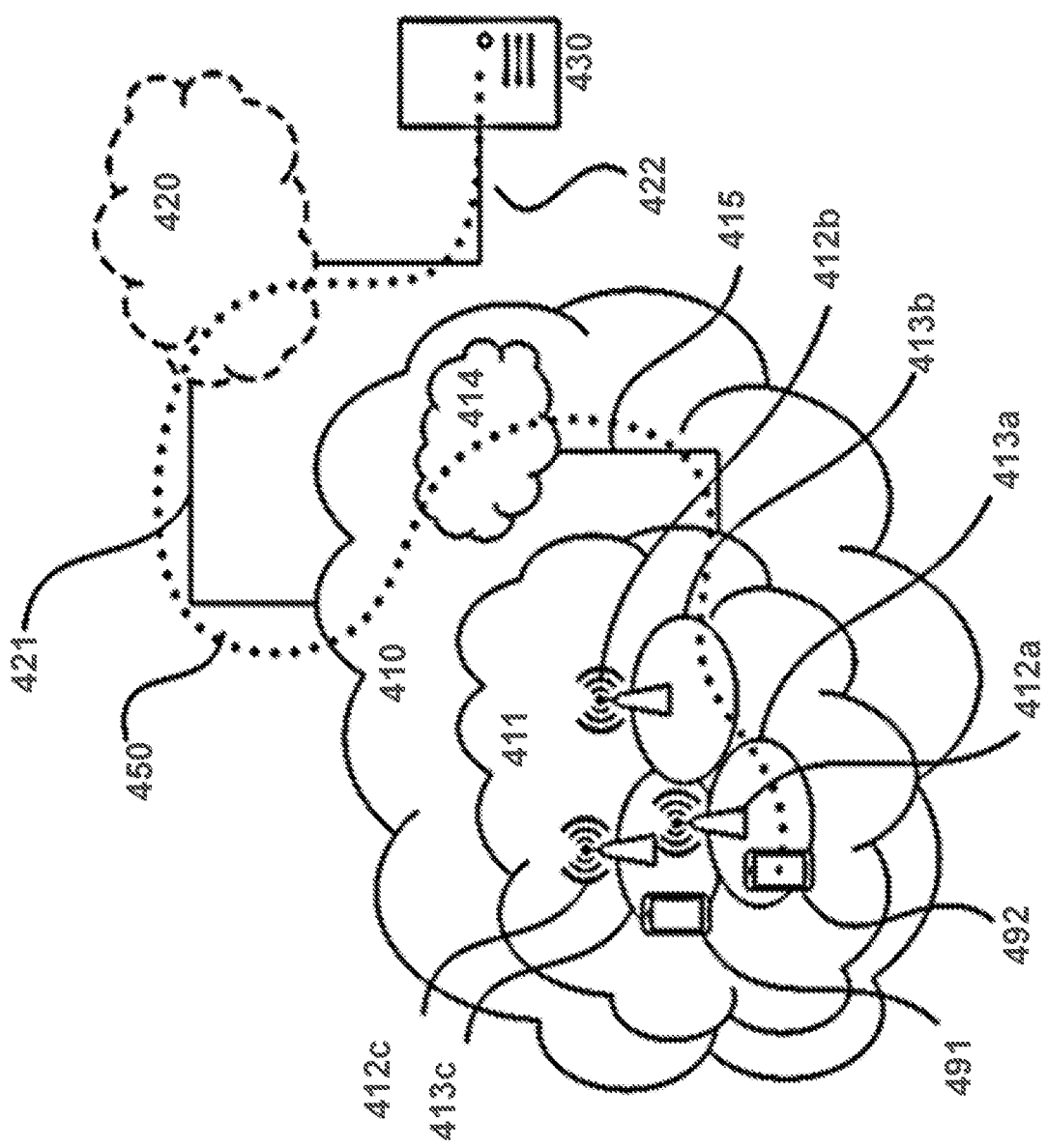
FIG. 14 illustrates an example telecommunication network connected via an intermediate network to a host computer, according to certain embodiments.

With reference to FIG. 14, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 14 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 15:
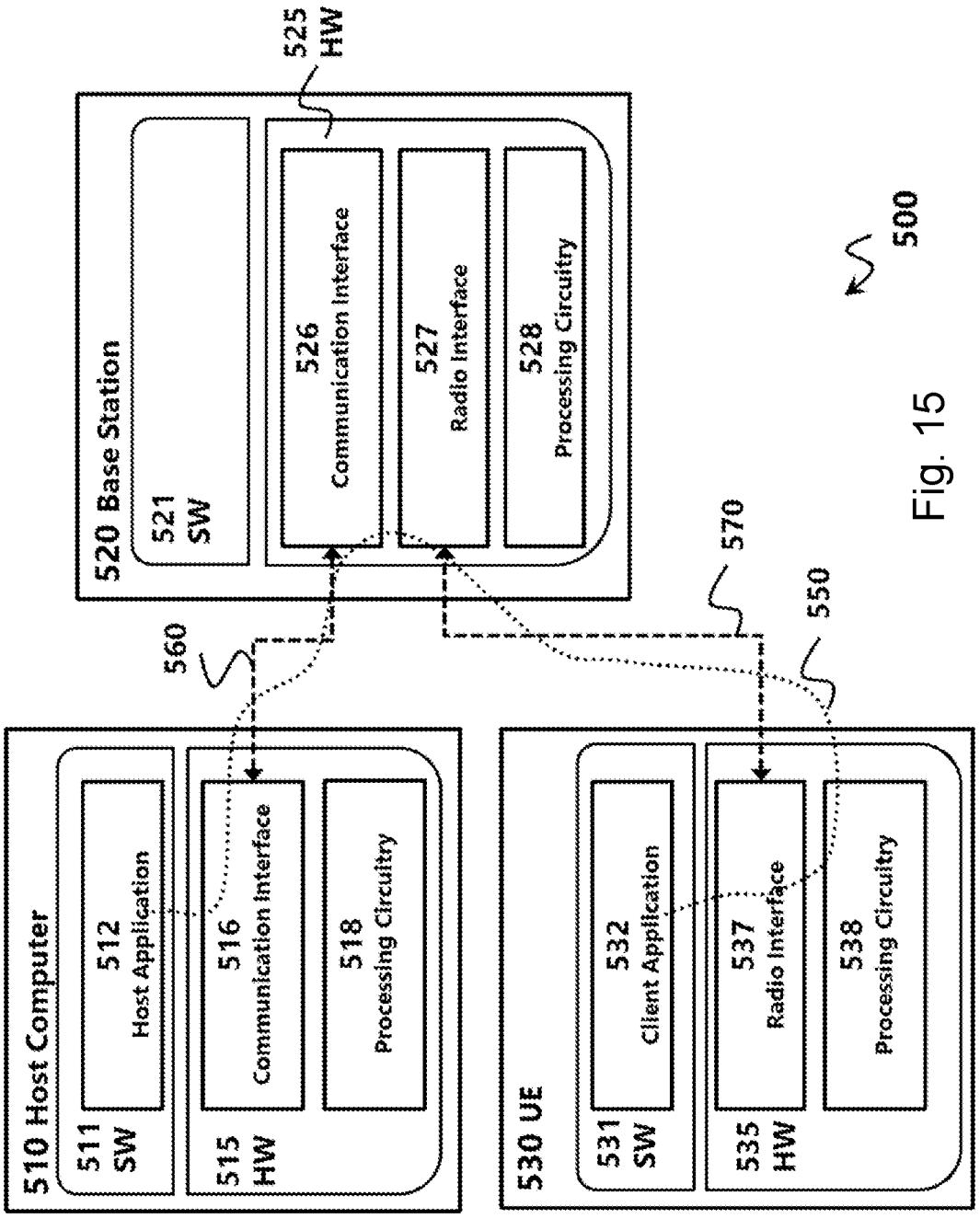
FIG. 15 illustrates an example host computer communicating via a base station with a user equipment over a partially wireless connection, according to certain embodiments.

FIG. 15 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 15. In communication system 500, host computer 510 comprises hardware 515 including communication interface 516 configured to set up and maintain a wired or wireless connection with an interface of a different communication device of communication system 500. Host computer 510 further comprises processing circuitry 518 which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as ICE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 15) served by base station 520. Communication interface 526 may be configured to facilitate connection 560 to host computer 510. Connection 560 may be direct, or it may pass through a core network (not shown in FIG. 15) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 5101, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 15 may be similar or identical to host computer 430, one of base stations 412a, 412b, 412c and one of UEs 491, 492 of FIG. 13, respectively. This is to say, the inner workings of these entities may be as shown in FIG. 15 and independently, the surrounding network topology may be that of FIG. 13.

In FIG. 15, OTT connection 550 has been drawn abstractly to illustrate the communication between host computer 510 and UE 530 via base station 520, without explicit reference to any, intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality, for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 5330, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 320. Such procedures and functionalities may be known and practiced in the art In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using MT connection 550 while it monitors propagation times, errors etc.

Figure 16:
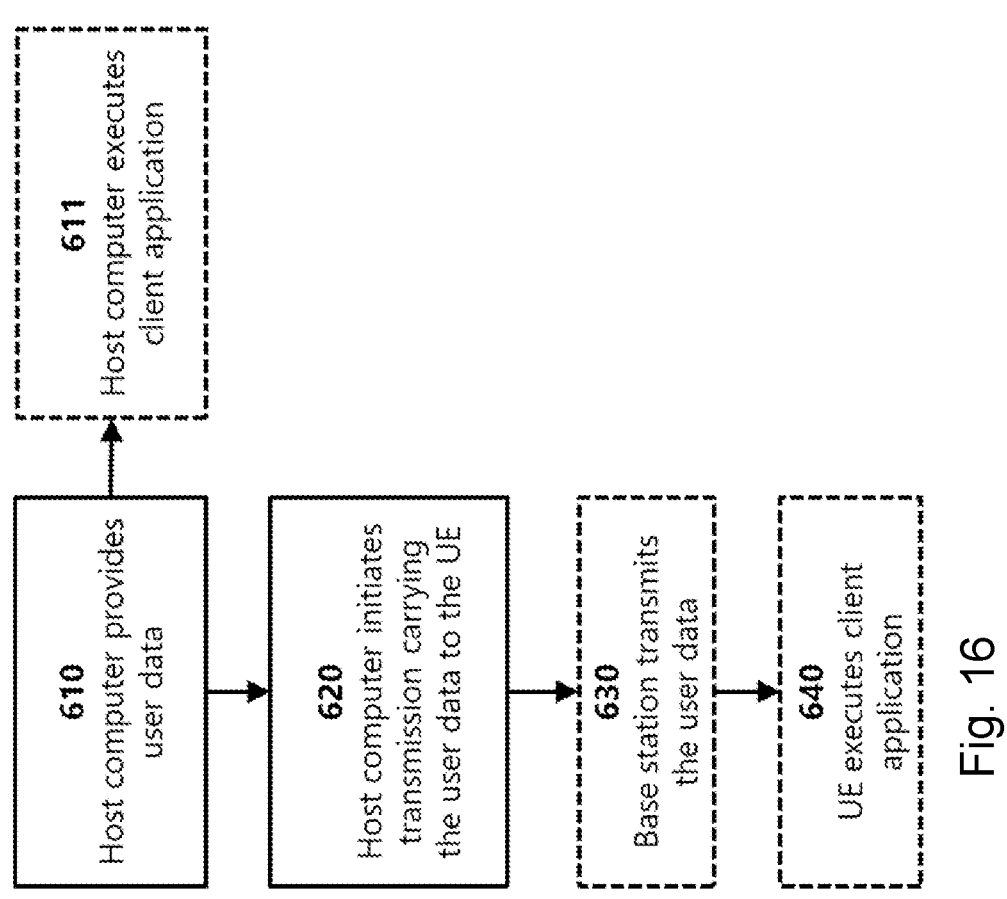
FIG. 16 is a flowchart illustrating a method implemented, according to certain embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 17:
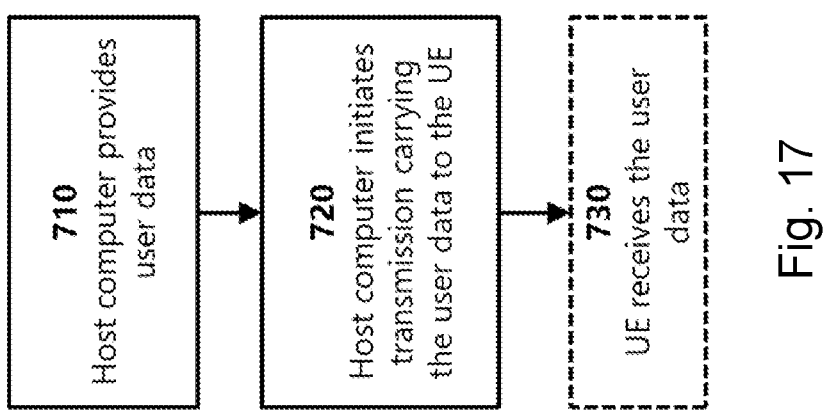
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section.

In step 810 (which may be optional), the UE receives input data provided by the host computer. Additionally, or alternatively, in step 820, the UE provides user data In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 19:
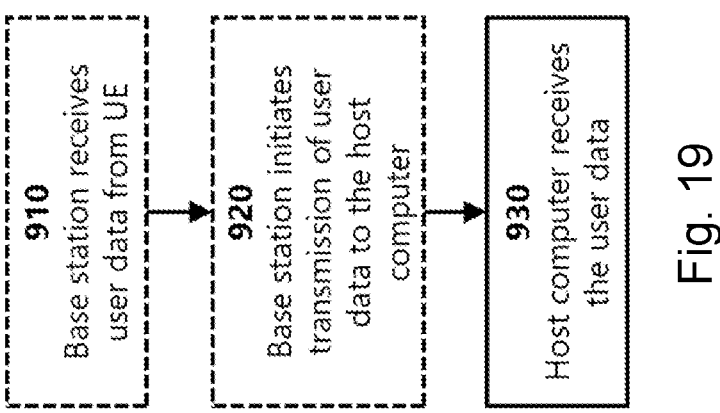
FIG. 19 is a flowchart illustrating a method implemented in a communication system, according to certain embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred other any subsequent listing(s).

1×RTT CDMA2000 1× Radio Transmission Technology
3GPP 3rd Generation Partnership Project
5G 5th Generation
ABS Almost Blank Subframe
ACK/NACK Acknowledgment/Non-acknowledgment
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
COMA Code Division Multiplexing Access
CG Configured Grant
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DCI Downlink Control Information
DFTS-OFDM Discrete Fourier Transform Spread OFDM
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
GF Grant-Free
gNB Base station in NR
GNSS Global Navigation Satellite System
GSM Global System for Mobile communication
HARD Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MCS Modulation and Coding Scheme MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-A RQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUR Preconfigured Uplink Resources
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference
Signal Received Power
RSRQ Reference Signal Received Quality OR Reference
Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SPS Semi-Persistent Scheduling
SUL Supplemental Uplink
SS Synchronization Signal
SSS Secondary Synchronization Signal
TA Timing Advance
TDD Time Division Duplex
TDOA Time Difference of Arrival
TO Transmission Occasion
TOA Time of Arrival
TSS Tertiary Synchronization Signal
TTI Transmission Time Internal UE User Equipment
UL Uplink
URLLC Ultra-Reliable and Low-Latency Communica-
tions
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network
The invention claimed is:

1. A method performed by a wireless device, the method comprising:
obtaining an indication of an initial resource region, the initial resource region comprising time frequency resources, wherein the time frequency resources are divided into a plurality of scheduling occasions (SOs) and each of the plurality of SOs is associated with an uplink beam;
determining the wireless device has moved out of coverage of a first beam and that uplink resources associated with the first beam should no longer be used;
selecting a second beam for uplink transmission;
selecting a SO associated with the second beam from the initial resource region; and
transmitting an initial transmission of uplink data in the selected SO using the second beam.

2. The method of claim 1, wherein selecting the second beam comprises selecting a beam based on downlink radio quality of a plurality of beams.

3. The method of claim 1, wherein the uplink data includes at least one of a wireless device identifier, hybrid automatic repeat request (HARQ) process identifier, redundancy value, and modulation and coding scheme (MCS).

4. The method of claim 1, wherein the uplink data includes a buffer status report (BSR).

5. The method of claim 1, wherein two or more SOs are associated with the same beam, and selecting a SO associated with the second beam comprises randomly selecting one of two or more SOs associated with the second beam.

6. The method of claim 1, further comprising:
in response to transmitting the initial transmission, receiving a scheduling grant from the network node, the scheduling grant comprising an indication of time frequency resources not included in the initial resource region; and
transmitting uplink data in the time frequency resources indicated in the scheduling grant.

7. The method of claim 1, further comprising:
determining the wireless device has moved out of coverage of the second beam and that uplink resources associated with the second beam should no longer be used;
selecting a third beam for uplink transmission;
selecting a SO associated with the third beam from the initial resource region; and
transmitting an initial transmission of uplink data in the selected SO using the third beam.

8. A wireless device comprising processing circuitry configured to:
obtain an indication of an initial resource region, the initial resource region comprising time frequency resources, wherein the time frequency resources are divided into a plurality of scheduling occasions (SOs) and each of the plurality of SOs is associated with an uplink beam;

determine the wireless device has moved out of coverage of a first beam and that uplink resources associated with the first beam should no longer be used;

select a second beam for uplink transmission;

select a SO associated with the second beam from the initial resource region; and transmit an initial transmission of uplink data in the selected SO using the second beam.

9. The wireless device of claim 8, wherein the processing circuitry is configured to select the second beam by selecting a beam based on downlink radio quality of a plurality of beams.

10. The wireless device of claim 8, wherein the uplink data includes at least one of a wireless device identifier, hybrid automatic repeat request (HARQ) process identifier, redundancy value, and modulation and coding scheme (MCS).

11. The wireless device of claim 8, wherein the uplink data includes a buffer status report (BSR).

12. The wireless device of claim 8, wherein two or more SOs are associated with the same beam, and the processing circuitry is configured to select a SO associated with the second beam by randomly selecting one of two or more SOs associated with the second beam.

13. The wireless device of claim 8, the processing circuitry further operable to:

in response to transmitting the initial transmission, receive a scheduling grant from the network node, the scheduling grant comprising an indication of time frequency resources not included in the initial resource region; and transmit uplink data in the time frequency resources indicated in the scheduling grant.

14. The wireless device of claim 8, the processing circuitry further operable to:

determine the wireless device has moved out of coverage of the second beam and that uplink resources associated with the second beam should no longer be used;

select a third beam for uplink transmission;

select a SO associated with the third beam from the initial resource region; and transmit an initial transmission of uplink data in the selected SO using the third beam.

15. A method performed by a network node, the method comprising:

obtaining an indication of an initial resource region, the initial resource region comprising time frequency resources, wherein the time frequency resources are divided into a plurality of scheduling occasions (SOs) and each of the plurality of SOs is associated with an uplink beam;

transmitting the indication of the initial resource region to one or more wireless devices;

receiving an initial transmission of uplink data from a wireless device in a first SO of the plurality of SOs; and determining an uplink beam used by the wireless device for the initial uplink transmission based on the beam associated with the first SO.

16. The method of claim 15, wherein the uplink data includes at least one of a wireless device identifier, hybrid automatic repeat request (HARQ) process identifier, redundancy value, and modulation and coding scheme (MCS).

17. The method of claim 15, wherein the uplink data includes a buffer status report (BSR).

18. The method of claim 15, further comprising transmitting a scheduling grant to the wireless device, the scheduling grant comprising an indication of time frequency resources not included in the initial resource region.

19. The method of claim 15, further comprising:

receiving a second initial transmission of uplink data from the wireless device in a second SO of the plurality of SOs; and determining an uplink beam used by the wireless device for the initial uplink transmission based on the beam associated with the second SO.

20. A network node comprising processing circuitry configured to:

obtain an indication of an initial resource region, the initial resource region comprising time frequency resources, wherein the time frequency resources are divided into a plurality of scheduling occasions (SOs) and each of the plurality of SOs is associated with an uplink beam;

transmit the indication of the initial resource region to one or more wireless devices;

receive an initial transmission of uplink data from a wireless device in a first SO of the plurality of SOs; and determine an uplink beam used by the wireless device for the initial uplink transmission based on the beam associated with the first SO.

21. The network node of claim 20, wherein the uplink data includes at least one of a wireless device identifier, hybrid automatic repeat request (HARQ) process identifier, redundancy value, and modulation and coding scheme (MCS).

22. The network node of claim 20, wherein the uplink data includes a buffer status report (BSR).

23. The network node of claim 20, the processing circuitry further configured to transmit a scheduling grant to the wireless device, the scheduling grant comprising an indication of time frequency resources not included in the initial resource region.

24. The network node of claim 20, the processing circuitry further configured to:

receive a second initial transmission of uplink data from the wireless device in a second SO of the plurality of SOs; and determine an uplink beam used by the wireless device for the initial uplink transmission based on the beam associated with the second SO.

* * * * *